US008514758B2

(12) United States Patent
De Kimpe et al.

(10) Patent No.: US 8,514,758 B2
(45) Date of Patent: Aug. 20, 2013

(54) LOW-POWER WIRELESS MULTI-HOP NETWORKS

(75) Inventors: Wim De Kimpe, Zele (BE); Stephan Noel, Ixelles (BE); Bram Van Den Bosch, Berchem (BE)

(73) Assignee: Greenpeak Technologies, Antwerp (BE)

( * ) Notice: Subject to any disclaimer, the term of this patent is extended or adjusted under 35 U.S.C. 154(b) by 804 days.

(21) Appl. No.: 12/519,299

(22) PCT Filed: Dec. 13, 2007

(86) PCT No.: PCT/EP2007/063880
§ 371 (c)(1),
(2), (4) Date: Dec. 16, 2009

(87) PCT Pub. No.: WO2008/071762
PCT Pub. Date: Jun. 19, 2008

(65) Prior Publication Data
US 2010/0097969 A1      Apr. 22, 2010

(30) Foreign Application Priority Data

Dec. 15, 2006   (EP) .................................... 06026012

(51) Int. Cl.
*G08C 17/00*     (2006.01)
(52) U.S. Cl.
USPC ......................................................... 370/311
(58) Field of Classification Search
USPC ......................................................... 370/311
See application file for complete search history.

(56) References Cited

U.S. PATENT DOCUMENTS 6,292,508 B1 * 9/2001 Hong et al. .................... 375/134
7,948,939 B2 * 5/2011 Sugaya et al. ................ 370/329
(Continued)

FOREIGN PATENT DOCUMENTS

| EP | 1 473 870 A | 11/2004 |
| EP | 1 657 852 A | 5/2006 |

(Continued)

OTHER PUBLICATIONS

Examination Report of EPO regarding European Application No. 07857527.1, May 7, 2012.
(Continued)

*Primary Examiner* — Brandon Renner
*Assistant Examiner* — Faisal Choudhury
(74) *Attorney, Agent, or Firm* — Bacon & Thomas, PLLC

(57) ABSTRACT

A method of communication or transmission of data between a first and a second node in a wireless multi-hop network comprises bringing the first node and the second node in a fully operative mode for communication with each other and subsequently bringing the first node and the second node in a reduced operative mode where no communication with any other node is possible and, before bringing the second node in the fully operative mode, bringing the second node in a listening mode during a token listening period to check for presence of a wake-up token from the first node, and thereafter bringing the second node into the reduced operative mode if no wake-up token is received, and bringing the second node into the fully operative mode for reception of data from the first node if a wake-up token is received. This wake-up scheme is a kind of scheduled rendezvous scheme with collision avoidance, and may be called an induced wake-up scheme. It is advantageous because of its low power consumption (nodes only wake up completely when a message is present for them to receive) and because of the low latency in data transfer. The wake-up tokens used enable random access to other nodes, nevertheless having a system which is low-power in operation.

20 Claims, 12 Drawing Sheets

(56) References Cited

U.S. PATENT DOCUMENTS

| | | | |
|---|---|---|---|
| 8,233,456 B1 * | 7/2012 | Kopikare et al. | 370/332 |
| 2006/0128349 A1 * | 6/2006 | Yoon | 455/343.2 |
| 2006/0133408 A1 * | 6/2006 | Nogueira-Nine et al. | 370/447 |
| 2007/0002821 A1 * | 1/2007 | Carlson et al. | 370/349 |
| 2007/0264963 A1 * | 11/2007 | Srinivasan et al. | 455/343.2 |

FOREIGN PATENT DOCUMENTS

| | | |
|---|---|---|
| EP | 1657852 A1 | 5/2006 |
| WO | WO 2006/069067 A | 6/2006 |

OTHER PUBLICATIONS

Schurgers C. et al.: "Topology Management for Sensor Networks: Exploiting Latency and Density", MOBIHOC 2002. Proceedings of the $3^{rd}$ ACM International Symposium on Mobile Ad Hoc Networking and Computing. Lausanne, Switzerland, Jun. 9, 2002, pp. 135-145, XP001171557.

Search Report of EPO regarding European Patent Application No. 07 857 527.1, May 6, 2011.

* cited by examiner

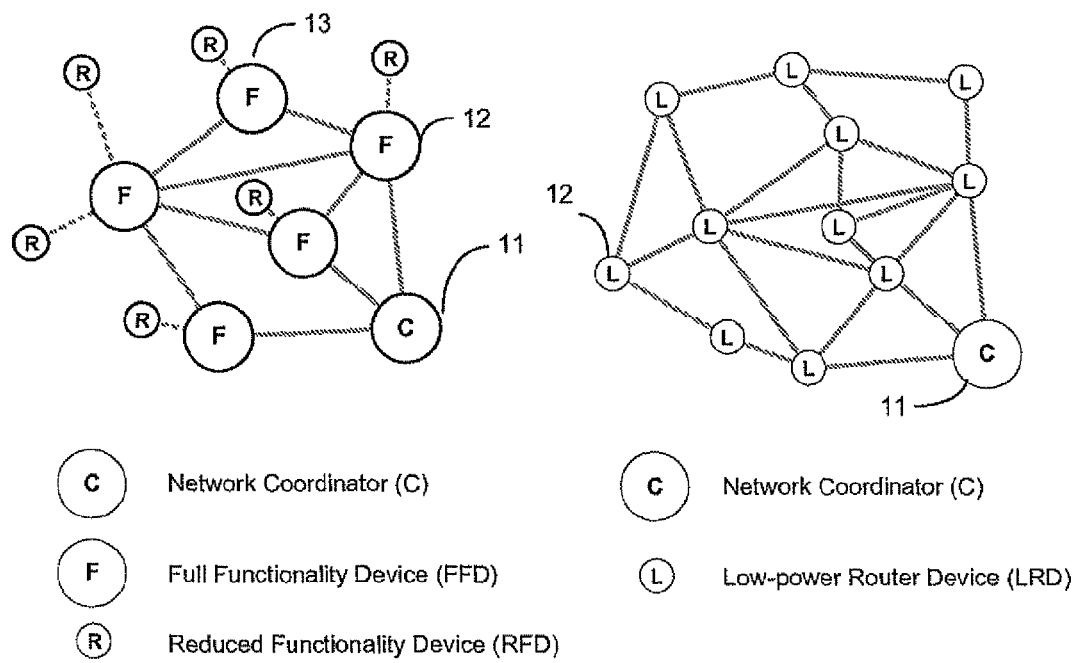
- C — Network Coordinator (C)
- F — Full Functionality Device (FFD)
- R — Reduced Functionality Device (RFD)
- C — Network Coordinator (C)
- L — Low-power Router Device (LRD)
Fig. 1A  Fig. 1B
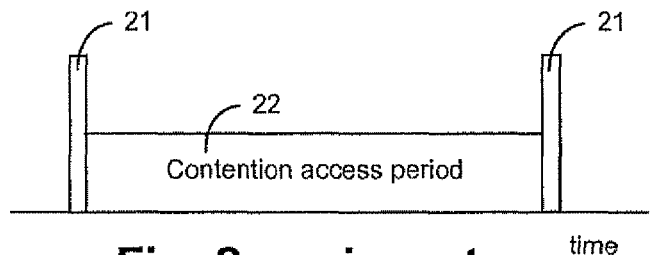
Fig. 2 – prior art
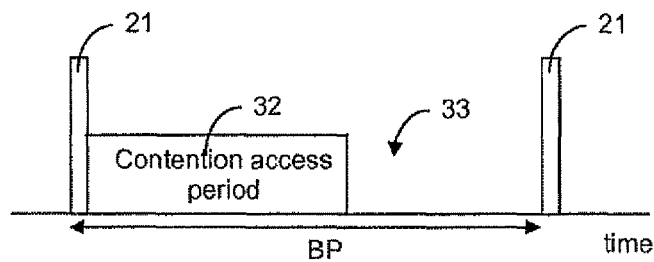
Fig. 3 – prior art

| Octets: 4 | 1 | 1 | 2 | 1 | 2 | 2 | 2 |
|---|---|---|---|---|---|---|---|
| Preamble | SFD | 9 | FCF | Seq Nmbr | PANID | Destination Address | FCS |
| | Start of Frame Delimiter | Frame length | Frame Control Field | Sequence Number | | | Frame check sequence, aka CRC |

Fig. 4

LOW-POWER WIRELESS MULTI-HOP NETWORKS

TECHNICAL FIELD OF THE INVENTION

The present invention relates generally to the field of communication networks. More specifically, the present invention relates to the field of wireless networks for data communication, more particularly to wireless multi-hop networks forming ad hoc networks, and, in embodiments of the present invention, to beacon-enabled wireless multi-hop networks. Still more specifically, the present invention may relate to a low-power low-rate wireless data communication system comprising a plurality of nodes organised in a multi-hop network, and to a low-power method of communication between nodes in a multi-hop network. The present invention is particularly useful for all kinds of wireless sensor applications.

BACKGROUND OF THE INVENTION

A wireless network is a flexible data communications system, which uses wireless media such as radio frequency technology to transmit and receive data over the air, minimizing the need for wired connections.

Wireless networks use electromagnetic waves such as e.g. radio signals or infrared signals, to communicate information from one point to another without relying on any physical connection. One type of electromagnetic waves, radio waves, are often referred to as radio carriers because they simply perform the function of delivering energy from a local transmitter to a remote receiver. The data being transmitted is superimposed on the electromagnetic wave, in the example given a radio carrier, so that it can be accurately extracted at the receiving end. Once data is superimposed (modulated) onto the radio carrier, the radio signal occupies more than a single frequency, since the frequency or bit rate of the modulating information adds to the carrier. Multiple radio carriers can exist in the same space at the same time without interfering with each other if the radio waves are transmitted on different radio frequencies. To extract data, a radio receiver tunes in one radio frequency while rejecting all other frequencies. The modulated signal thus received is then demodulated and the data is extracted from the signal.

Wireless networks are highly desirable communication networks because they do not suffer from the cost and labour of installing cables (eliminating the need to pull cables through ceilings and walls), and they permit greater flexibility in locating and optionally moving communication equipment (the network can be extended to places that cannot be wired).

One particular field for usage of wireless networks is sensor applications. The requirements of wireless sensor applications are straightforward: network coverage of the sensor environment must be absolute, the installation process should be plug-and-play and the reliability must be extremely high. The multi-hop or mesh network concept as shortly explained below, provides an answer to all three challenges.

Multi-hop networks comprise a plurality of nodes organised into a network of wireless connection paths between the nodes. Multi-hopping is a way of routing data, voice and instructions between the nodes in the network. It allows for continuous connections and reconfiguration around blocked paths by "hopping" from node to node until a connection can be established.

In a multi-hop network, there is typically one special node, called a network co-ordinator that starts the network. All other nodes connect to the network through this co-ordinator or through another node that was connected to the network before.

In multi-hop wireless networks intermediate nodes act as repeaters and/or routers for other nodes. Hence messages hop from one node to another, thereby bridging longer distances than could be spanned by a single wireless link between two nodes. In order for a first node to be able to repeat/route messages from a second node, the first node is first set in a receiving state. After reception of the message from the second node, the first node is set in a transmitting state, for repeating or routing the message further to a third node, which in turn is set in a receiving state.

Multi-hop networking provides an answer to the challenge of network coverage put forward by wireless sensor applications: as nodes are dispersed over a limited location, e.g. a building, and every node is able to communicate to its neighbour nodes that are within electromagnetic wave reception distance, the full environment is actually enveloped in a cloud of electromagnetic waves, e.g. radio waves. State of the art multi-hop network technology may be self-forming and self-healing. This means that the network will set itself up without manual intervention. New nodes will associate automatically to the network. When a node is removed or a link between any two nodes is disturbed, then the network automatically reconfigures on-the-fly to re-establish reliable communication (self-healing property). This means that the network can still operate even when a node breaks down or a connection goes bad. As a result, a very reliable network is formed.

The traditional answer to low-power requirements is to lower the duty cycle of the application: nodes wake-up every once in a while to transmit information and go in deep sleep (low-power) otherwise. This solution is also applied for achieving low-power operation of nodes in a multi-hop wireless network. When in a sleeping state, a node is not able to receive messages from other nodes and neither is it able to perform its repeater/router function.

As can be easily seen by a person skilled in the art, the requirements of "multi-hop capable" and "low-power" are contradictory per se. In a multi-hop network one relies on neighbour low-power nodes to forward messages. But neighbour nodes in sleeping-mode will never hear the message to be forwarded. Therefore, in order to allow for low-power operation, yet at the same time allow multi-hop network operation, some synchronization in the sleep and wake-up cycles of nodes is needed, at least between neighbouring nodes.

Neither basic WIFI nor Bluetooth use the concept of multi-hop networking. Basic WIFI relies on the base-station concept: a base-station serves a local area of approx. 15 m in diameter. Spots further away from the base-station have limited or no radio coverage. Advanced Win base stations, however, can also be used as a wireless router. Mostly they are setup up manually, possibly with help of some installation wizard software to make the setup a bit easier. Multi-hop networks on WIFI is a big research domain, they are often called 'MANET's (metropolitan area networks or mobile ad-hoc networks). Such MANET is a kind of wireless ad-hoc network, and is a self-configuring network of mobile routers (and associated hosts) connected by wireless links, the union of which forms an arbitrary topology. The routers are free to move randomly and organise themselves arbitrarily; thus, the network's wireless topology may change rapidly and unpredictably. Bluetooth is based on the scatternet principle, where nodes can associate with one or more neighbour nodes, but have no ability to route messages between two neighbours as in a mesh network.

From a power saving standpoint, the duty cycle of each node in a multihop network should be as low as possible. However, as nodes perform a co-operative task, they need to co-ordinate their sleep/wake-up times. Hence, a sleep/wake-up scheduling algorithm is required. Ideally, it should allow neighbouring nodes to be active at the same time, thus making packet exchange feasible even when nodes operate with a low duty cycle (i.e. they sleep for most of the time). "Low duty cycle" reduces the energy consumption of nodes significantly as it keeps nodes active mainly only when there is network activity. There are presently three types of sleep/wake up algorithms: scheduled rendezvous, asynchronous and on-demand.

Scheduled rendezvous schemes require that all neighbouring nodes wake up at the same time. Typically, nodes wake up periodically to check for potential communication. Then, they return to sleep until the next rendezvous time. A major advantage of such schemes is that when a node is awake it is guaranteed that all its neighbours are awake as well. This allows sending broadcast messages to all neighbours. However such schemes require clock synchronisation. Different scheduled rendezvous protocols differ in the way network nodes sleep and wake up during their lifetime. One way is using a Fully Synchronised Scheme. In this scheme all nodes in the network wake up at the same time periodically and remain active for a fixed time. Then, they return to sleep until the next wake-up point. A further improvement can be achieved by allowing nodes to switch off their radio when no activity is detected after a timeout value. One disadvantage of the fully synchronised scheme is that nodes try to transmit simultaneously in the active time, thus causing a large number of collisions. One technique to avoid this is to use staggered wake-up times.

Asynchronous schemes avoid the tight synchronisation among network nodes required by scheduled rendezvous schemes. They allow each node to wake up independently of the others but guarantee that neighbours always have overlapping active periods within a specified number of cycles.

On-demand schemes are based on the idea that a node should awaken only when it has to receive a packet from a neighbouring node. This minimises the energy consumption. In such a network, nodes are in a monitoring or listening state for most of the time. As soon as an event is detected, nodes transit to the active or transfer state. On-demand sleep/wake-up schemes are aimed at reducing energy consumption in the monitoring state while ensuring a limited latency for transitioning in the transfer state. The implementation of such schemes typically requires two different channels: a data channel for normal data communication, and a wake-up channel for awaking nodes when needed. All present proposals rely on two different radios, e.g. a low power wake-up radio and a main radio for traffic. A drawback is the additional cost for the second radio.

EP-1657852 relates to an energy efficient mechanism for establishing and maintaining a communication between nodes in a wireless communication system. A destination node listens to a communication channel periodically. For requesting services from the destination node, a wake-up signal is transmitted from a source node to the destination node via the communication channel. The wake-up signal comprises a repetition of a signal block, each signal block comprising a preamble and a data packet. The wake-up signal duration and content is adapted depending on the system operation context to reduce either idle times, power consumption, latency or network blocking. However, it is a disadvantage of this system that it still has a high power consumption and a risk of data collision.

Schurgers C. et al. describe in "Topology Management for Sensor Networks: Exploiting Latency and Density", Mobihoc 2002, Proceedings of the $3^{rd}$ ACM International Symposium on Mobile ad hoc networking and computing, Lausanne, Switzerland, 9 Jun. 2002, a wireless sensor network comprising a plurality of nodes. The communication between two nodes is done at two different frequencies: f1 for the wake-up signal, f2 for the data transmission. According to this document, when a node wants to wake up one of its neighbours, it starts sending beacon packets until it receives a response from the target node.

SUMMARY OF THE INVENTION

It is an object of the present invention to provide good apparatus and methods for achieving low-power communication between nodes in a multi-hop network.

The above objective is accomplished by a method and device according to the present invention.

In a first aspect, the present invention provides a method of communication in a wireless multi-hop network, the method being according to a scheduled rendezvous scheme with a mechanism of on-demand staying awake. A scheduled rendezvous scheme requires that neighbouring nodes wake up at the same time or that there is at least some overlap in wake up periods between neighbouring nodes. Typically, nodes wake up periodically to check for potential communication. Then, they return to sleep until the next rendezvous time. A major advantage of such scheduled rendezvous scheme is that when a node is awake, it is guaranteed that some or all of its neighbours are awake as well. This allows sending broadcast messages to some or all neighbours. The scheduled rendezvous scheme may be a fully synchronised rendezvous protocol, in which all nodes in the network wake up at the same time according to a pre-determined, e.g. periodic, pattern. Alternatively, the scheduled rendezvous scheme may be a staggered scheduled rendezvous scheme, in which nodes located at different levels of the data gathering tree wake up at different times. Obviously, active time periods of nodes belonging to adjacent levels must be partially overlapping to allow nodes to communicate with their neighbours. In accordance with the present invention, nodes, once woken up, do not remain active for a pre-determined, fixed time if no message is to be sent to them; they only remain active on demand.

In embodiments of the present invention, a method of communication or transmission of data is provided, for example, but not limited thereto, sensor signals, between a first and a second node in a wireless multi-hop network. The wireless multi-hop network is an ad hoc or peer-to-peer network, meaning that each node is willing to forward data for other nodes, and that the determination of which nodes forward data is made dynamically based on the network connectivity. This is in contrast to older network technologies in which some designated nodes, usually with custom hardware and variously known as routers, switches, hubs, and firewalls, perform the task of forwarding the data. The method in accordance with the present invention comprises bringing the first node and the second node in a fully operative mode for communication with each other and subsequently bringing the first node and the second node in a reduced operative mode where no communication with any other node is possible. This means that the nodes are in intermittent operation, also called duty cycled operation. The method in accordance with the present invention furthermore comprises, before bringing the second node in the fully operative mode, bringing the second node in a listening mode during a token listening period to check for presence of a wake-up token from the first node, and thereafter bringing the second node into the reduced operative mode if no wake-up token is detected or received, and bringing the second node into the fully operative mode for reception of data from the first node if a wake-up token is detected or received. In accordance with embodiments of the present invention, the number of wake-up tokens, sent by the first node during the time the first node is in said fully operative mode is not more than three wake-up tokens. This wake-up scheme is a kind of scheduled rendez-vous scheme with collision avoidance, and may be called an induced wake-up scheme. It is advantageous because of its low power consumption (nodes only wake up completely when a message is present for them to receive) and because of the low latency in data transfer. The wake-up tokens used enable random access to other nodes, nevertheless having a system which is low-power in operation.

In accordance with embodiments of the present invention, not only collision avoidance on the data transmission may be performed, but also collision avoidance on the token transmission. In accordance with embodiments of the present invention, both types of collision avoidance may be performed independently from one another.

In accordance with embodiments of the present invention, in band signalling is used, meaning that the wake-up tokens and subsequently sent wireless data packets are sent on a same channel. Thus there is no need for separate channels to be provided as known in on-demand wake-up schemes, being a data channel for normal data or traffic communication, and a wake-up channel for awaking nodes when needed although the present invention does not exclude this possibility from its scope. Also the present invention does not require separate radios as known in on-demand wake-up schemes, being a radio for normal data or traffic communication, and a wake-up radio for awaking nodes when needed although the present invention does not exclude this possibility from its scope. Nevertheless, in accordance with the present invention it is preferred not to use two radios. It is to be noted that it is desired in accordance with embodiments of the present invention to avoid the presence or use of two radios or two radio receive/transmit paths, but that it is usual to have several channels with one radio, e.g. at different times or on different frequencies or using different spreading codes.

A method in accordance with embodiments of the present invention may furthermore comprise the first node transmitting at least one wake-up token to the second node before transmitting data to the second node. The first node may transmit a plurality of wake-up tokens to the second node before transmitting data to the second node. There is a link between synchronisation quality and the number of wake-up tokens that need to be sent for waking up another node. In case no synchronisation between nodes is done, wake-up tokens are continuously sent during a complete period in between two token listening periods for a single node, in order to make sure that at least one wake-up token is heard by the node to be woken up. In case of a synchronised network, depending on the synchronisation quality, less tokens can be sent. In the ultimate case, where synchronisation between nodes is optimal, sending a single token is sufficient to wake up another node. As such optimal synchronisation is difficult and expensive to achieve, most often a slight drift between nodes might occur, and preferably a node will send a plurality of wake-up tokens in order to wake up another node. Preferably, however, in case of synchronised networks, synchronisation is good enough so that not more than five wake-up tokens need to be sent.

A method in accordance with embodiments of the present invention may furthermore comprise synchronising the timing of the listening mode of the second node with the timing of the transmitting the at least one wake-up token by the first node, so as to make transmitting wake-up tokens and listening for wake-up tokens happen in the same time. The synchronising may include one node transmitting a beacon or pilot signal and another node synchronising with the beacon or pilot signal. Multi-hop beaconing may be provided by a first node emitting a beacon or pilot signal, second nodes neighbouring the first node synchronising to the beacon or pilot signal and themselves then emitting a further beacon or pilot signal, to which third nodes neighbouring the second nodes synchronise, etc. Alternatively, the synchronising may include nodes synchronising on an external synchronisation signal, such as e.g. a signal from an atomic clock or a radio controlled clock. According to embodiments of the present invention, all nodes in the network may synchronise with the synchronisation signal, e.g. beacon or pilot signal or external synchronisation signal such as atomic clock or radio controlled clock signal. This is advantageous as it enables the whole network to be synchronised to one single source, e.g. the network coordinator. Device synchronisation is advantageous as it reduces power consumption: in combination with the induced wake-up scheme in accordance with the present invention it reduces or minimises the number of wake-up tokens that need to be sent to a neighbouring node, since the sender knows when the neighbouring node will wake-up and will adapt the timing of its wake-up token accordingly.

In embodiments of the present invention, a wake-up token is a short electromagnetic wave data packet, e.g. an RF or IR data packet, with a length of a few hundred microseconds up to a few milliseconds, e.g. between 200 µs and 5 ms, preferably between 200 µs and 1 ms, still more preferred between 200 µs and 0.5 ms. It will be clear that, the shorter the wake-up tokens are, the better it is.

According to embodiments of the present invention, transmitting at least one wake-up token may comprise performing a collision avoidance scheme on the wake-up tokens. Different mechanisms may be used in such collision avoidance scheme, such as for example:

carrier sensing, also called clear channel assessment, avoids collisions, as a node, before sending a wake-up token senses whether the channel the message is to be sent on is idle or busy. If the channel is sensed "idle" then the node is permitted to transmit the wake-up token or wake-up tokens. If the channel is sensed as "busy" the first node has to defer its transmission.

random slot selection for transmission of wake-up tokens spreads the risk of collisions. In this case, the nodes in the network are assigned to different slots for sending the wake-up tokens. A plurality of nodes may be assigned to a same slot.

canceling token transmission if during listening for wake-up tokens already sent it is found that another node has already sent a wake-up token to a same destination node. This is very powerful in data gathering networks like e.g. sensor networks, where the data flow is naturally organized as a tree, where multiple children need to send to a same parent.

In particular embodiments of the present invention, the collision avoidance scheme on transmitting at least one wake-up token may comprise a first phase of allocating a time slot for transmission of the at least one wake-up token and a second phase of actually transmitting the at least one wake-up token during the allocated time slot. This way of working has the advantage that collisions between wake-up tokens are reduced, minimised or avoided. The first phase may have a duration of a pre-determined number of time slots, wherein allocating a time slot for transmission of the at least one wake-up token by a node may be randomised over the plurality of time slots of the first phase. Allocating a time slot for transmission of the at least one wake-up token may comprise performing a clear channel assessment.

According to embodiments of the present invention, at least one node may be scheduled to be brought in a listening mode when at least one other node is scheduled not to be brought in a listening mode. This way, timeslots for sending and polling for wake-up tokens may be distributed over different nodes. This has the advantage that power consumption is reduced or minimised, while maintaining latency requirements. At the same time, collisions of data packets (wake-up tokens and real messages, i.e. wireless communication data packets) are reduced, minimised or avoided.

A method according to embodiments of the present invention may furthermore comprise transmitting a wireless communication data packet from the first node to the second node. Such method may furthermore comprise the second node acknowledging receipt of the wireless communication data packet to the first node.

Transmitting a wireless communication data packet may comprise implementing a collision avoidance scheme on transmission of wireless communication data packets by different nodes. Any suitable collision avoidance scheme may be applied in performing this.

In a second aspect, a wireless data communication system is provided, the data communication system being adapted for performing data communication according to a scheduled rendezvous scheme, the data communication system being arranged with a mechanism of on-demand staying awake.

A wireless data communication system according to embodiments of the present invention provides a wireless data communication system comprising a plurality of nodes organised or organisable into a multi-hop network of connection paths between said nodes. The nodes are adapted for having a reduced operative mode, also called sleep mode, in which said node is inoperative to transmit or receive wireless communications and thus consumes minimal power, and an fully operative mode, also called active mode, during which said node is operative to transmit or receive wireless communications to or from a neighbouring node within reception range. A node is furthermore adapted for, before going into the fully operative mode, going in a listening mode during which it listens for tokens sent by a neighbouring node within reception range. The node is adapted for deciding, depending on the outcome of the listening mode, the decision criterion during the listening mode being whether a wake-up token has been received or not, to go into the fully operative mode if a wake-up token has been received from a neighbouring node, or to go into the reduced operative mode if no such wake-up token is received. The number of wake-up tokens sent by the first node during the time the first node is in said fully operative mode is not more than three wake-up tokens. The wireless data communication system according to embodiments of the present invention shows the advantage that it is only active during those periods when a neighbouring node will transmit a message. Therefore the wireless data communication system according to embodiments of the present invention is very power efficient.

The present invention has the advantage that the use of the wake-up tokens enables random access to nodes, nevertheless keeping a system which is low-power in operation. Or in other words, it is a low-power system that still emulates a fully random access medium.

According to embodiments of the present invention, a node the wireless data communication system may comprise a receiver for receiving wireless communications data packets from a neighbouring node, a transmitter for transmitting wireless communication data packets to a neighbouring node, and a processor, said processor being programmed to bring the node in the listening mode at pre-determined time intervals to listen for tokens sent by a neighbouring node within reception range, and if such token is received, to bring the node into its fully operative mode, and if not, to bring the node into its reduced operative mode. It is an advantage of a wireless data communication system that one and the same transmitter is used for transmitting wake-up tokens and main data. This reduces the additional cost for a second radio as known in some prior art solutions.

A wireless data communication system according to embodiments of the present invention may furthermore comprise a counter for timing the duration of the listening mode. The counter may be hardware implemented or may be implemented in software.

According to embodiments of the present invention, a node may be adapted for transmitting, during its fully operative mode, a wireless communication data packet to a neighbouring node which is also brought in its fully operative mode. The neighbouring node may optionally be adapted for, after having received the wireless communication data packet, transmitting an acknowledgement message to the node.

A wireless data communication system according to embodiments of the present invention may furthermore comprise an internal time reference for synchronising operation of the nodes. The internal time reference may include a beaconing or pilot system. Alternatively, the wireless data communication system according to embodiments of the present invention may be adapted to synchronise on an external synchronisation signal, such as e.g. an atomic clock signal or a radio controlled clock signal.

A node in a wireless data communication system according to embodiments of the present invention may furthermore comprise a time slot allocation unit for allocating a time slot for sending data packets.

A node in a wireless data communication system according to embodiments of the present invention may furthermore be adapted to perform clear channel assessment before transmission of a wireless communication data packet.

In a third aspect, the present invention provides the use of a wireless data communication system of embodiments of the present invention in sensor applications, for example but not limited to fire or gas alarm applications or building access authorization applications.

In a fourth aspect, the present invention provides a controller for controlling operation of a node in a wireless multi-hop network, the controller comprising first mode switching means for bringing the node in a listening mode during a token listening period to check for presence of a wake-up token transmitted by another node, second mode switching means for bringing the node in a fully operative mode for communication with another node if a wireless communication data packet is to be sent to another node or if a wake-up token is received from another node, and third mode switching means for bringing the node in a reduced operative mode where no communication with any other node is possible if no wireless communication data packet is to be sent to another node and if no such wake-up token is received. The controller may be an embedded controller.

In a fifth aspect, the present invention provides a computer program product, i.e. software, enabling a processor to carry out a method in accordance with embodiments of the first aspect of the present invention.

The present invention also provides a machine readable data storage device storing the computer program product of the fifth aspect of the present invention, as well as transmission of such computer program product over a local or wide area telecommunications network.

It is an advantage of aspects of the present invention is that is suited for transmission of data of two totally different types: both pre-determinedly, e.g. regularly, scheduled status updates from all nodes in the network, and low-latency messages (alarm messages) can travel over the network. Pre-determinedly scheduled status or sensor samples do not need low latency and can be transmitted using normal 802.15.4 beacon enabled networks. But low latency cannot be obtained with such standard networks. Alarm packets, on the other hand, could be sent only preceded by wake-up tokens as in accordance with the present invention, by sending a long burst (a series of wake-up tokens) until the destination node hears it, wakes up and stays awake. This does not require synchronisation. However, when doing regular status updates, the power consumption of sending long bursts of wake-up tokens would be too high for what it is worth. Therefore, a combined system making use of wake-up tokens for on-demand waking up of nodes for sending alarm packets and scheduled waking up of nodes for status or sensor samples, is provided in accordance with embodiments of the present invention. The scheduled wake-up for transmission of status or sensor samples occurs far less often than the token listening periods.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIGS. 1A and 1B illustrate two types of multi-hop networks.

FIG. 2 illustrates a contention access period between two beacons, as known from the prior art.

FIG. 3 illustrates an active and an inactive period in between two beacons, as known from the prior art.

FIG. 4 illustrates a wake-up token frame format in accordance with an embodiment of the present invention.

Figure 5:
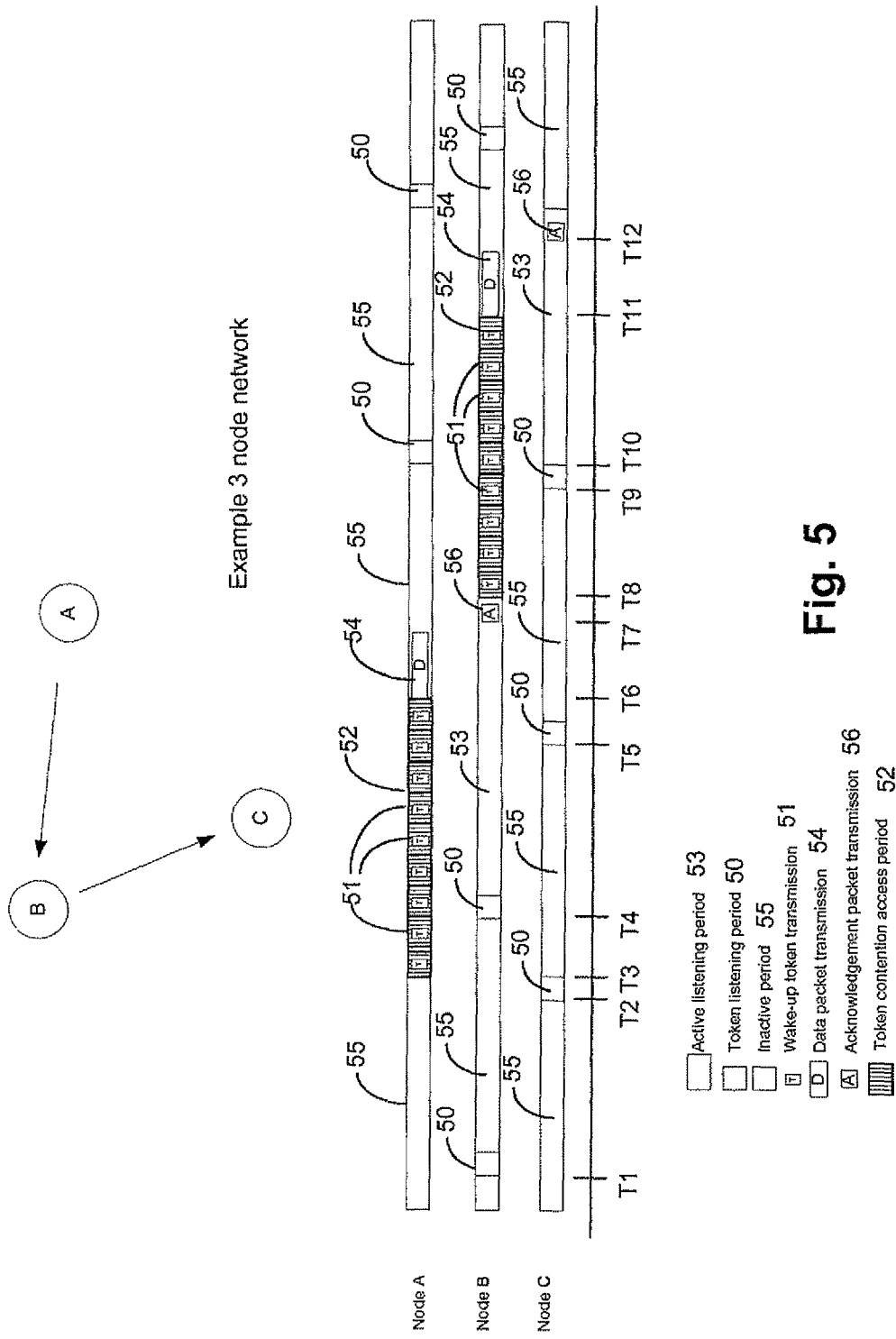
FIG. 5 is a schematic illustration of induced wake-up in accordance with an embodiment of the present invention, where communication between nodes takes place in an asynchronous network.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Wherever in the description the terms "wake-up token" (single) or "wake-up tokens" (plural) are used, it is to be understood that one or more wake-up tokens may be meant, independently of the use of the single or the plural.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or the element of a method. Furthermore, an element of an apparatus embodiment described herein is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

A multi-hop wireless network in accordance with the present invention comprises a plurality of nodes organised into or organisable into a wireless network of interconnection paths. Such nodes may form an ad hoc wireless network or a peer to peer (P2P) wireless network. The present invention may be used for any type of multi-hop network connecting nodes to each other through a wireless network path, but will be explained more in detail with regard to a multi-hop network in accordance with the IEEE 802.15.4 Wireless Networking Standards. This standard provides specifications for devices that have low data rates, consume very low power and are thus characterised by long battery life. The present invention is particularly useful for low data rate wireless networks. Other standards, like Bluetooth and IrDA, address high data rate applications such as voice, video and LAN communications.

One example of a protocol ratified under this standard, and which can be used with the present invention, is the ZigBee protocol. The present invention, however, is not limited to wireless networks established in accordance with the ZigBee protocol. The ZigBee protocol is a standard for embedded application software that has been ratified in 2004 under IEEE 802.15.4 Wireless Networking Standards. It is an established set of specifications for wireless personal area networking (WPAN), e.g. digital radio connections between computers and related devices. The devices could include telephones, hand-held digital assistants, sensors and controls located within a few meters of each other.

Nodes in a multi-hop network can be any of two types: a full functionality node (FFD) or a reduced functionality node (RFD). An FFD can communicate with (talk to) RFDs or other FFDs, while an RFD can only communicate with (talk to) an FFD. These two types of nodes can be split into three categories:

- a co-ordinator node 11, also indicated C in FIG. 1A and FIG. 1B: This is the most capable device, and always is an FFD. The co-ordinator node forms the root of the network and might bridge to other networks, if available (not illustrated in the drawings). There is exactly one co-ordinator node in each multi-hop network at any moment in time. However, two nodes in a multi-hop network could both be coordinator-capable, where the second node can be used as a backup if the first one fails. In that sense, over time, there may be more than 1 coordinator node. The co-ordinator node 11 is able to store information about the network. Usually the co-ordinator node 11 is powered from a stable power source such as mains power or a large re-chargeable battery, e.g. within an automobile.
- a router node 12, indicated F in FIG. 1A and L in FIG. 1B: Router nodes can act as an intermediate node, passing data from one node to another node. Router nodes are FFDs. Router nodes F as in FIG. 1A are mains powered, while router nodes L (low-power router nodes) as in FIG. 1B are usually battery powered.
- an end node 13, indicated R in FIG. 1A: Such end node contains just enough functionality to talk to its parent node (which is either the co-ordinator node C or a router node F which is within electromagnetic wave transmission range from the end node). It cannot relay data from another node to yet another node. It requires the least amount of memory, and therefore can be less expensive to manufacture than a co-ordinator node 11 or a router node 12. An end node 13 is an RFD. Usually an end node 13 is battery powered.

Wherever there is reference to battery powered it should be understood that energy sources from the environment can be used instead or can be used to charge the battery. Hence the present invention can make use of any energy harvesting method such as ones making use of mechanical movements, light sources, electromagnetic radiation sources, heat and cold sources, etc. to provide power to the nodes.

In accordance with embodiments of the present invention, the multi-hop network operates in a peer-to-peer (P2P) topology, as illustrated in FIG. 1A and in FIG. 1B. In a peer-to-peer topology any device or node can communicate with any other device or node as long as they are in electromagnetic wave transmission range of one another, e.g. in a radio sphere of influence. Peer-to-peer topology allows more complex network formations to be implemented, such as mesh networking topology. Applications such as industrial control and monitoring, e.g. building automatisation, wireless sensor networks, asset, inventory and people tracking, intelligent agriculture, healthcare supervision, e.g. home care and elderly care networks, automotive and safety and security benefit from such a network topology. A peer-to-peer network can be any of ad-hoc, self-organising and self-healing or a combination of these. It may allow multiple hops to route messages from any node to any other node on the network.

In a peer-to-peer topology, one node 11 will be nominated as co-ordinator, for instance by being the first device to communicate on a channel.

Embodiments of the present invention are preferably, but not necessarily, implemented in a synchronised network. The synchronised network may for example be a beacon-enabled or pilot-enabled network, where the beacons are used for synchronising the nodes of the network. In alternative embodiments, other suitable synchronisation means, like e.g. atomic clocks or radio controlled clocks, may also be used.

According to embodiments of the present invention, in a beacon-enabled or pilot-enabled network, the co-ordinator node 11 provides synchronisation services to other nodes 12, 13. The co-ordinator node 11 has a memory storing a neighbour list, i.e. a list of nodes 12, 13 which have joined the network and are within electromagnetic wave transmission range, e.g. within radio transmission range, from the co-ordinator node 11. In order to provide synchronisation services to other nodes 12, 13, the co-ordinator node 11 may broadcast beacon or pilot frames to neighbouring nodes 12, 13.

For setting up the multi-hop network, a candidate node wishing to join the network and receiving a pilot or beacon frame may request to join the network. If the co-ordinator node permits the candidate node to join, it will add the new node as a child node in its neighbour list. Then the newly joined node, itself also having a memory storing a neighbour list, will add the co-ordinator as its parent in its neighbour list and will begin transmitting periodic pilot or beacon signals as well. The periodic pilot or beacon signals of the newly joined node are synchronised with the periodic beacon or pilot signals of the coordinator node. The timing of the beacons of the newly joined node should be chosen such that it does not collide with the coordinator's beacons. Analogously, other candidate nodes may thereafter request to join the network, as a further child to the co-ordinator node. Each of the nodes newly added to the network as a child to the co-ordinator node is adapted for transmitting periodic beacon or pilot signals synchronised with the periodic beacon or pilot signals transmitted by the co-ordinator node. The timing of the beacons of each newly joined node should be chosen such that it does not collide with the coordinator's beacons nor with any other node's beacons.

If the original candidate node is not able to join the network at the co-ordinator node, it can search for another parent node, which may be any fully functional node already added to the network. An example of detailed procedures describing how a multi-hop network may be started and how nodes may join a network can be found in the IEEE 802.15.4 Wireless Networking Standards. The present invention is not limited to this scheme which is provided merely as an example. The described way of setting up a multi-hop network may or may not be used in combination with embodiments of the present invention.

It is known that beacon or pilot signals 21 transmitted by a particular node in a synchronised network are used to synchronise nodes attached to that particular node. In between two beacon or pilot signals 21, a contention access period 22 (CAP) may be available for communication, as illustrated in FIG. 2.

Any first node wishing to communicate with a second node during the contention access period (CAP) between two beacon or pilot signals 21 competes with other nodes using the network. The network protocols generally include a contention resolution scheme of which there are a significant number as known by a person skilled in the art. The contention resolution scheme may include an etiquette scheme, e.g. a scheme that defines the etiquette of when a node may transmit and when it may not. Such an etiquette scheme may include each node listening at one or more radio frequencies to check whether there is another node transmitting at the same time. Slotted CSMA-CA (carrier sense multiple access with collision avoidance) mechanism is only one example of a contention resolution scheme. In CSMA/CA, the first node, wishing to transmit, has to first listen to the channel for a predetermined amount of time so as to check for any activity on the channel. If the channel is sensed "idle" then the first node is permitted to transmit. If the channel is sensed as "busy" the first node has to defer its transmission. All transactions shall be completed during the contention access period 22, by the time of the next network beacon or pilot signal 21. Alternative contention schemes are known that require, for example, passing of a token (e.g. token ring) or retransmission after a collision of transmissions (e.g. Aloha). However, for low duty networks retransmission is usually an unnecessary feature as there is usually sufficient time for delaying a transmission.

In preferred and low-power embodiments of multi-hop networks in accordance with embodiments of the present invention, the time period between two beacon or pilot signals 21 can have an active period 32 and an inactive period 33, as illustrated in FIG. 3. All communications take place during the active period 32. During the inactive period 33, a node does not interact with another node and may enter a low-power or sleep mode. This way of working decreases power consumption of the network in general, and of the nodes going into low-power or sleep mode in particular. Various wake up/sleep schemes are known: synchronized wake-up (SWU), asynchronous wake-up and on-demand wake-up.

In a synchronised network, as stated above, synchronisation may be performed through a beacon or pilot signal system, wherein each node regularly sends out beacon or pilot signals, and synchronises itself to its 'parent' beacon or pilot signal, i.e. to the beacon or pilot signal of its parent node. Ultimately, this enables all the nodes 12 in the whole network to be synchronised to one single source, the network co-ordinator node 11.

Using a short time after the beacon or pilot signals (called the active period 32) for doing the actual data transfers, as intended by e.g. the IEEE 802.15.4 specification and as disclosed above, however, has two disadvantages:

a node 12 should be on during the complete active period 32 of all its neighbouring nodes, the active period for example having a duration between 50 and 200 ms, the node 12 hence consuming a lot of power. This is a waste of power if during that period the particular node does not need to receive or send data. As an example, a node 12 may consume 100 mA when sending data, 30 mA when being on but only listening, and only 10 µA when being in sleep mode.

The network latency can be as high as the number of hops or nodes a packet has to travel, times the beacon or pilot period BP as illustrated in FIG. 3.

Therefore, in accordance with embodiments of the present invention, the disadvantage of synchronised wake-up for data transfer is overcome by using a concept of induced wake-up (IWU), comprising transmitting wake-up tokens, which are very short RF packets sent by a node 12 wishing to transmit data, prior to the transmission of the data itself. In this system, any node 12 in the network will briefly wake up, during a wake-up listening period, on a defined basis, that may be a regular basis, to check for wake-up tokens from neighbours. If a wake-up token is received, the node 12 receiving the wake-up token stays awake until the actual transfer with the neighbouring node 12 is completed. If no token is received during the token listening period, the node 12 goes to sleep until the next token listening period.

In preferred embodiments of the present invention, the wake-up tokens include a destination address. This means that other, non-addressed nodes, can easily determine that they are not addressed and they will not stay awake, but go back to sleep immediately after their token listening period. An example of such wake-up tokens may be real 802.15.4 packets, as defined in the IEEE 802.15.4 standard. An example of a wake-up token frame format is illustrated in FIG. 4, from which it can be seen that the wake-up token includes a destination address or a representation of a network address. Other fields in the wake-up token frame format may include optionally a preamble, a start of frame delimiter, frame length, a frame control field, a sequence number, a PANID, a priority flag, a frame check sequence, a forward error correction sequence àr code and/or an error detection sequence or code. In case of a frame format as defined in the IEEE 802.15.4 standard, the frame type, which is part of the frame control field, may be set to 4, which is a reserved frame type in the standard. Furthermore, also in case of a frame format as defined in the IEEE 802.15.4 standard, source addressing mode and destination addressing mode, both part of the frame control field, may be set to "no address" and "destination short address" respectively.

In an asynchronous system, the nodes are not synchronised to each other. Communication using wake-up tokens in such asynchronous system is illustrated in FIG. 5. A burst of wake-up tokens can be sent by the node wishing to transmit data, prior to the transmission of the data itself. The burst of wake-up tokens should be scheduled to last long enough to make sure that the destination node receives at least one of those wake-up tokens. An advantage of such induced wake-up in accordance with the present invention over known asynchronous wake-up systems is that the induced wake-up system in accordance with embodiments of the present invention provides a system for collision avoidance on the tokens.

FIG. 5 illustrates, as an example only, token transmission in an asynchronous network comprising three nodes, Node A, Node B and Node C.

As can be seen in the data flow diagram at the top of FIG. 5, Node A sends data to Node B and Node B sends data to Node C. Each node is scheduled to have, at pre-determined, e.g. regular, time intervals, a token listening period, during which it listens for tokens sent to that node.

At time T1, Node B starts a token listening period 50, but no tokens are sent to Node B at that moment in time. At time T2, Node C starts a token listening period 50, but no tokens are sent to Node C at that moment in time. At time T3, Node A starts transmitting wake-up tokens 51 to Node B, during a token contention access period 52, which is a time period which is scheduled long enough to last at least until Node B comes into its next token listening period 50. At time T4, Node B comes in a token listening period 50. Node A is still transmitting wake-up tokens 51 to Node B. Node B detects that Node A is sending wake-up tokens 51 addressed to Node B, and therefore stays awake, or thus goes in fully active mode 53, after expiration of the token listening period 50. At time T6, Node A starts transmitting data to Node B during a data packet transmission period 54, and thereafter goes back into sleep mode 55. Node B, after having received the data packet, optionally sends an acknowledgement message back to Node A at time T7. In the meantime, at time T5, Node C started a token listening period 50, but no tokens were sent to Node C at that moment in time and Node C went back in its sleep mode 55. Immediately after having sent the acknowledgement message to Node A, at time 18, Node B starts to transmit wake-up tokens 51 to Node C, for a period scheduled to be long enough to make sure that Node C comes in its token listening mode, at time T9. After the token listening period started at time T9, Node C, having received at least one wake-up token 51 from Node B, stays awake during an active listening period 53, until Node B has transmitted a data message 54, starting at time T11. In the meantime, at time T10, node A has started a token listening period 50, during which no wake-up tokens 51 have been sent to Node A, and thus after the token listening period 50 of time T10 Node A goes back into its sleep mode 55. After having received the data packet 54, Node C optionally sends back an acknowledgement message 56 to Node B at time T12, and node B goes back into its sleep mode 55. The process of having token listening periods 50, sending wake-up tokens 51, waking up nodes and bringing them in active mode 53, and sending data 54, optionally with acknowledgement 56, is continued, according to the requirements of the network to send data around. It will be clear for a person skilled in the art that the network can comprise any suitable number of nodes, not limited to three as in the example given, and that the sequence of sending data around between nodes is not limited to what is described herein.

A big advantage of using the induced wake-up scheme in accordance to embodiments of the present invention separately (or thus asynchronously) is that faster network join times can be achieved: a node does not need to wait until it has received beacons or other synchronisation signals, it can join a network even before synchronisation is performed.

Figure 6:
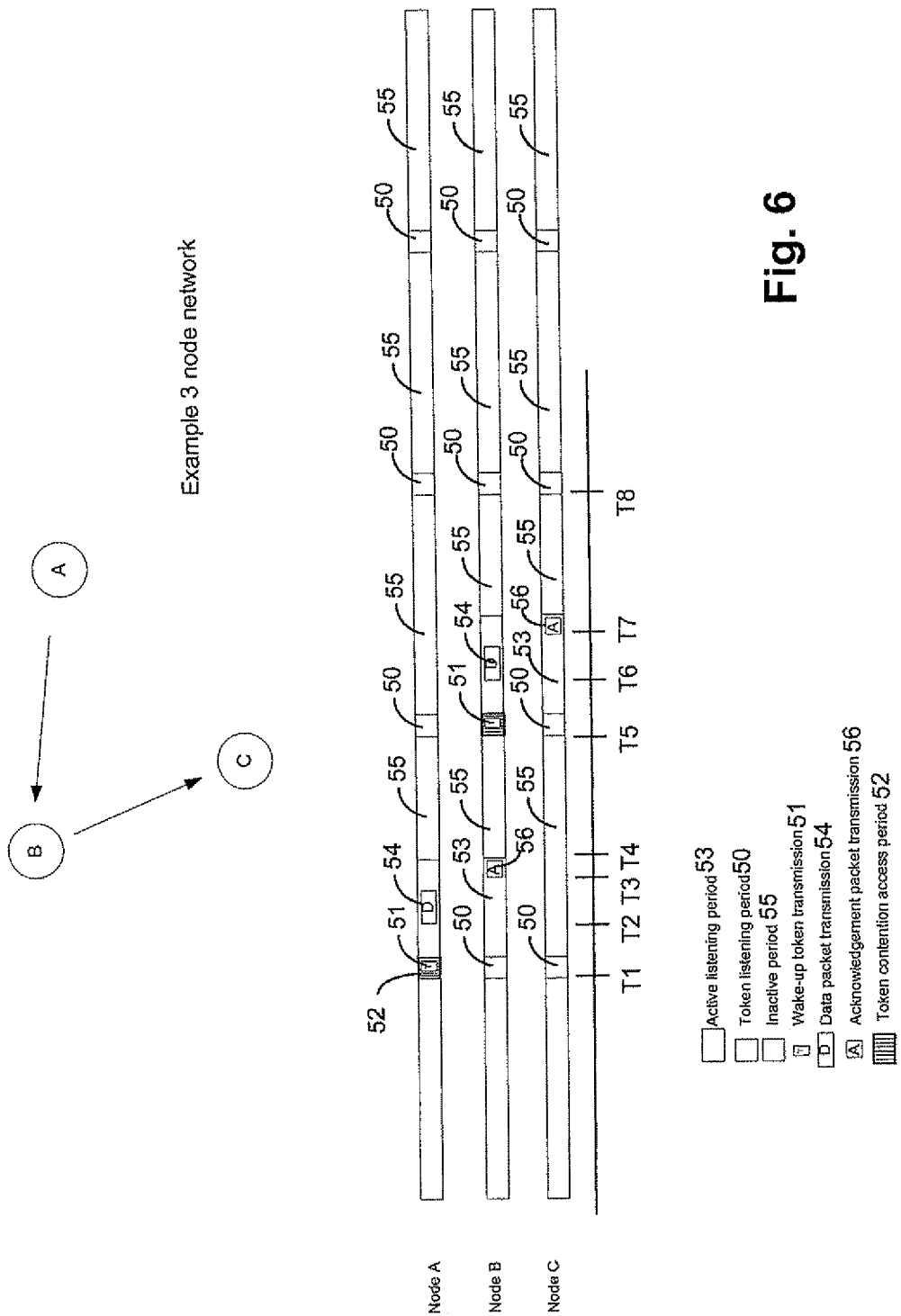
FIG. 6 is a schematic illustration of induced wake-up in accordance with an embodiment of the present invention

As an alternative embodiment, the induced wake-up concept in accordance with embodiments of the present invention is illustrated in FIG. 6 for three nodes, Node A, Node B and Node C in a synchronised network, e.g. a beacon-enabled network or pilot-enabled network. As can be seen in the data flow diagram at the top of FIG. 6, Node A sends data to Node B and Node B sends data to Node C. Each node is scheduled to have, at pre-determined, e.g. regular, time intervals, a token listening period 50, during which it listens for wake-up tokens 51 sent to that node. Moreover, contrary to the example described with reference to FIG. 5, now the token listening periods 50 are synchronized with respect to each other by any suitable means, meaning that corresponding token listening periods 50 for the plurality of nodes occur at a same moment in time. Nodes and their token listening periods 50 may be for example be synchronized by means of an internal beacon or pilot system, or by using an external clock signal such as an atomic clock signal or a radio controlled clock signal.

In the example illustrated in FIG. 6, it can be seen that at time T1, Node A transmits a wake-up token 51 to Node B, while Node B and Node C have a token listening period 50.

No tokens are sent to Node C at that moment in time, so after the token listening period 50, Node C goes back into sleep mode 55. As Node A has sent a wake-up token 51 to Node B, Node B stays awake and goes into fully operative mode 53, ready for receiving data. At time T2, Node A starts transmitting data 54, which is received by Node B. Node B, after having received the data packet 54, optionally sends an acknowledgement message back to Node A at time T3 and thereafter goes back into sleep mode 55. At time T4, after having received the acknowledgement message, Node A also goes back into sleep mode 55. At T5, next token listening periods 50 are scheduled, synchronized for the plurality of nodes Node A, Node B, Node C. Node B starts transmitting a wake-up token 51 to Node C, and Nodes A and C go into token listening mode during a token listening period 50. No wake-up tokens are sent to Node A, so after expiry of the token listening period 50, Node A goes back into sleep mode 55. Node C, on the other hand, has received the wake-up token from Node B, and goes into fully operative mode 53, ready for receiving data from Node B. At time T6, Node B starts to transmit data 54, which is received by Node C. After complete reception of the data message 54, at time T7, Node C optionally sends an acknowledgement message 56 to Node B, after which Node C goes back into sleep mode 55. After reception of the acknowledgement message 56, also Node B goes back into sleep mode 55. At time T8, token listening periods 50 are scheduled for all nodes Node A, Node B, Node C. As no wake-up tokens are being sent around the network, none of the nodes go into fully operative mode, and all go back into sleep mode 55.

The process of having token listening periods 50, sending wake-up tokens 51, waking up nodes and bringing them in active mode 53, and sending data 54, optionally with acknowledgement 56, is continued, according to the requirements of the network to send data around. It will be clear for a person skilled in the art that the network can comprise any suitable number of nodes, not limited to three as in the example given, and that the sequence of sending data around between nodes is not limited to what is described herein.

By comparing the synchronized network from FIG. 6 with the asynchronous network from FIG. 5, it can be seen that less wake-up tokens 51 need to be sent to wake up a node. Nevertheless, although in the example illustrated only one wake-up token 51 is sent to wake up a node, in reality a few wake-up tokens 51 may be sent, in order to increase the chance of the wake-up token 51 being transmitted during an on-period of a destination node, to compensate for some drift on the synchronization between the nodes. The number of wake-up tokens transmitted is preferably as low as possible, in order not to waste transmission energy; however, it is preferably large enough so as to avoid that wake-up tokens from a transmitting node, e.g. Node A, are transmitted only at time intervals when a receiving node, e.g. Node B, is inactive (sleep mode). Transmission of at least one and not more than five wake-up tokens is preferred. Preferably not more than five wake-up tokens are sent to wake up a node, more preferred not more than three wake-up tokens are sent. The number of wake-up tokens 51 to be sent is depending on the quality of the synchronization of the nodes.

Non-transmitting nodes, i.e. nodes not transmitting wake-up tokens, briefly wake up during token listening periods 50 on a defined basis that can be a regular basis to check for wake-up tokens from neighbours. In the examples illustrated in FIG. 5 and FIG. 6, Node A, Node B and Node C wake up for a time period of about a few milliseconds, e.g. 5 ms, to listen for wake-up tokens from neighbouring nodes. Nodes not receiving wake-up tokens from any other node, after their token listening period 50 has expired, go back into sleep mode 55. Nodes, however, receiving one of the wake-up tokens 51 transmitted by another node, determine that they have to stay active in order to receive a data packet 54 from that other node. The sending or transmitting node, after having transmitted the wake-up tokens 51, starts transmitting the data packet 54, which data packet 54 is received by the receiving node. Optionally, after having received the data packet 54, the receiving node may acknowledge receipt of the data packet 54 by sending back an acknowledgement packet 56.

Figure 7:
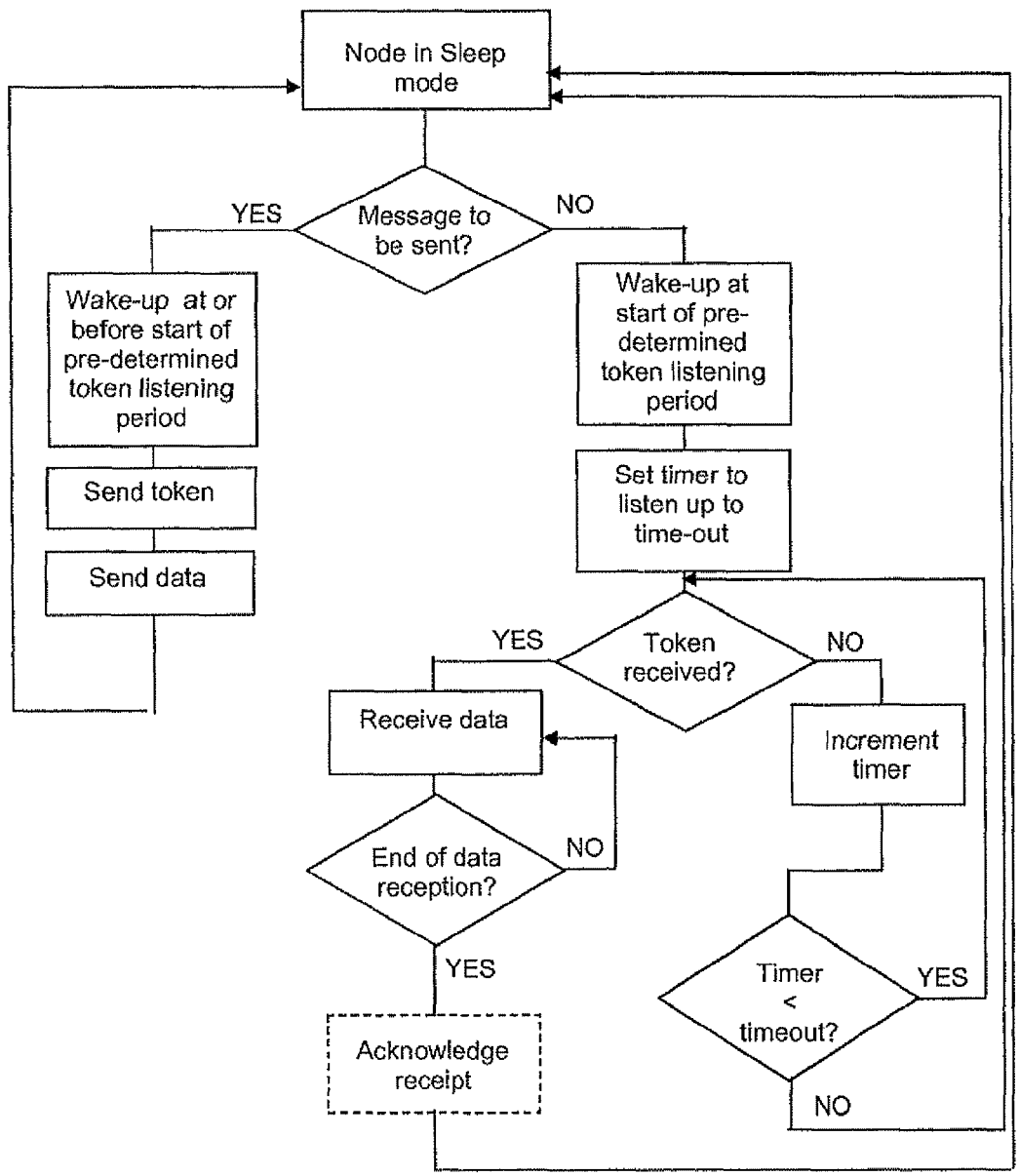
FIG. 7 is a flow chart illustrating method steps of the method for induced wake-up in accordance with embodiments of the present invention, both for a transmitting node and for a receiving node.

A diagrammatic overview of the procedure is illustrated in the flow chart of FIG. 7.

A node in sleep mode has to determine whether it has to transmit a data packet to another node. If so, that node wakes up, in principle at the start of a pre-determined token listening period, but in practice shortly before that start. The node sends at least one wake-up token, and thereafter sends the data, after which the node can go back into sleep mode. Optionally, before going into sleep mode the node can wait during a pre-determined period of time for reception of an acknowledgement message. If such acknowledgement message is not received, the node goes back into sleep mode storing the fact that the message has to be resent after the next pre-determined token listening period.

If the node in sleep mode does not need to transmit a data packet, it wakes up at the start of a pre-determined token listening period. A timer is set for the node to listen and check if a wake-up token is received by that node. If no wake-up token is received before time-out, the node goes back into sleep mode. If before time-out a wake-up token is received, the node remains active and operative to receive data. It continues receiving data up to the end of the transmitted message. Optionally, after having received the complete message, the node may send back an acknowledgement message to the transmitting node, after which the receiving node goes back into sleep mode.

Figure 8:
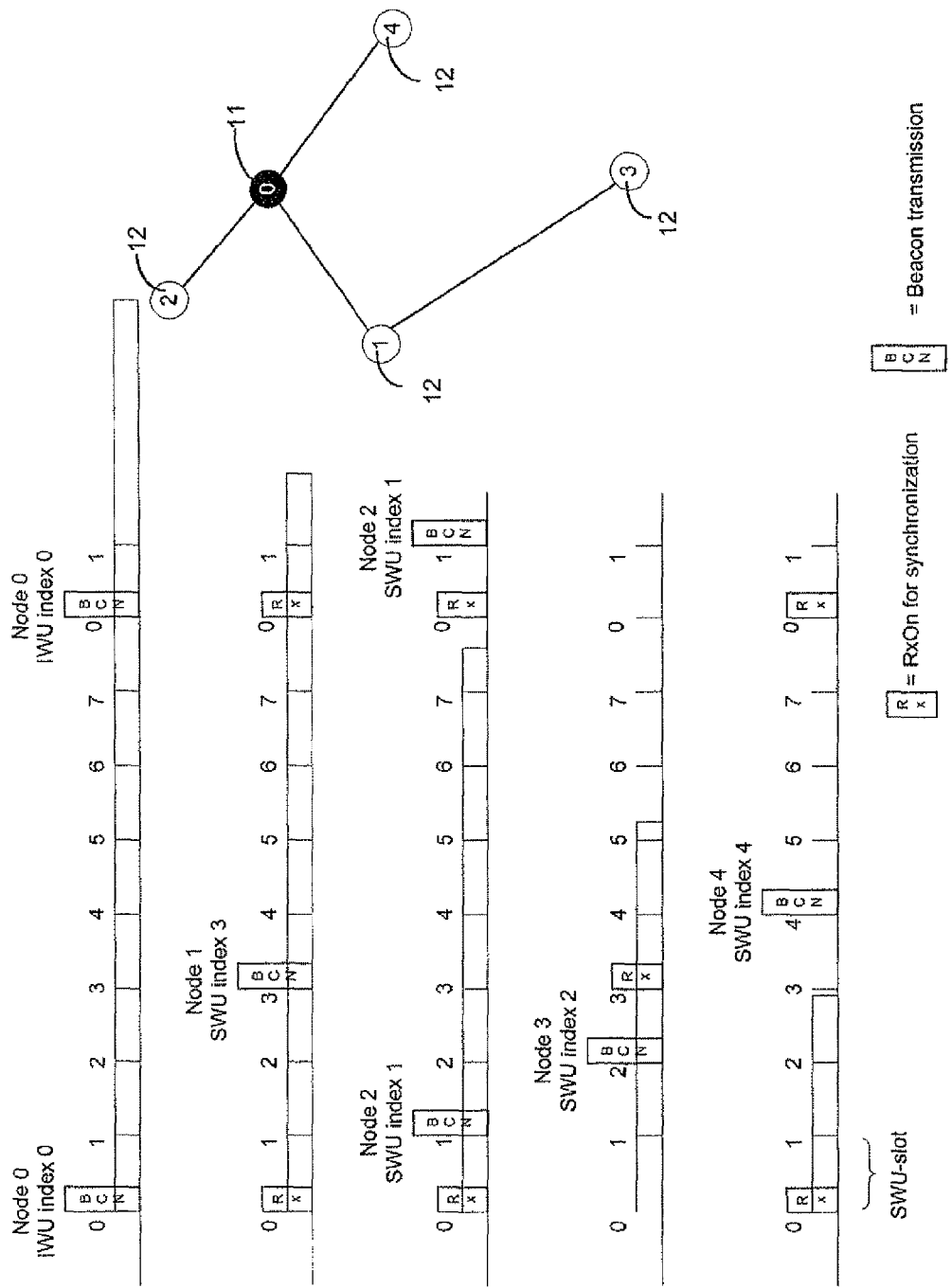
FIG. 8 illustrates that scheduling of beacons avoids collision of beacons.

In synchronised networks, more in particular in beacon-enabled or pilot-enabled networks, beacon or pilot signals are emitted by the nodes for synchronisation purposes. FIG. 8 illustrates how scheduling of beacons avoids beacon collision. FIG. 8 shows an example of beacon scheduling in a network comprising one co-ordinator node 11, and four nodes 12, numbered as node 1, node 2, node 3 and node 4 in FIG. 8. The beacons are scheduled, so that no two neighbouring nodes transmit a beacon or pilot signal at a same moment in time. The method behind the scheduling mechanism goes beyond the scope of the present invention. Beacon scheduling can be done in any of several ways: it can for example be administered centrally, or it can for example be administered in a distributed way, where a node checks the presence of beacons from its neighbours and from its neighbour's neighbours.

It can be seen from the example illustrated in FIG. 8 that at timeslot 0 the co-ordinator node 0 transmits its beacon signal. Its neighbouring nodes, node 1, node 2 and node 4 are in synchronisation mode at that moment in time, and wait for the beacon signal. The nodes neighbouring to the co-ordinator node are scheduled to each transmit a beacon or pilot signal at different moments in time: node 2 has SWU (synchronised wake-up) index 1, node 1 has SWU index 3 and node 4 has SWU index 4, meaning that these nodes transmit their beacon or pilot signals 1, 3 or 4 timeslots later, respectively, than the transmission of the beacon or pilot signal of the co-ordinator node 0. Node 3, which is a child from node 1, synchronises on reception of the beacon or pilot signal from node 1, and sends its own beacon or pilot signal in a pre-determined timeslot after having received the beacon or pilot signal from node 1, in the example illustrated 7 timeslots after having received the beacon or pilot signal.

The beacon or pilot period, i.e. the time period between two subsequent beacon or pilot signals, may be constant or may vary over time. Typically a beacon period of 16 or 32 seconds may be used, but this is not intended to be limiting for the present invention. The beacon or pilot period can be any suitable time period. The number of token listening periods in between two beacon or pilot signals may be pre-determined for a particular network. Alternatively, the number of token listening periods in between two beacon or pilot signals may be set by the co-ordinator node and may be indicated in the beacon or pilot signal. This way, the number of token listening periods in between two beacon or pilot signals can be changed on the fly.

Figure 9:
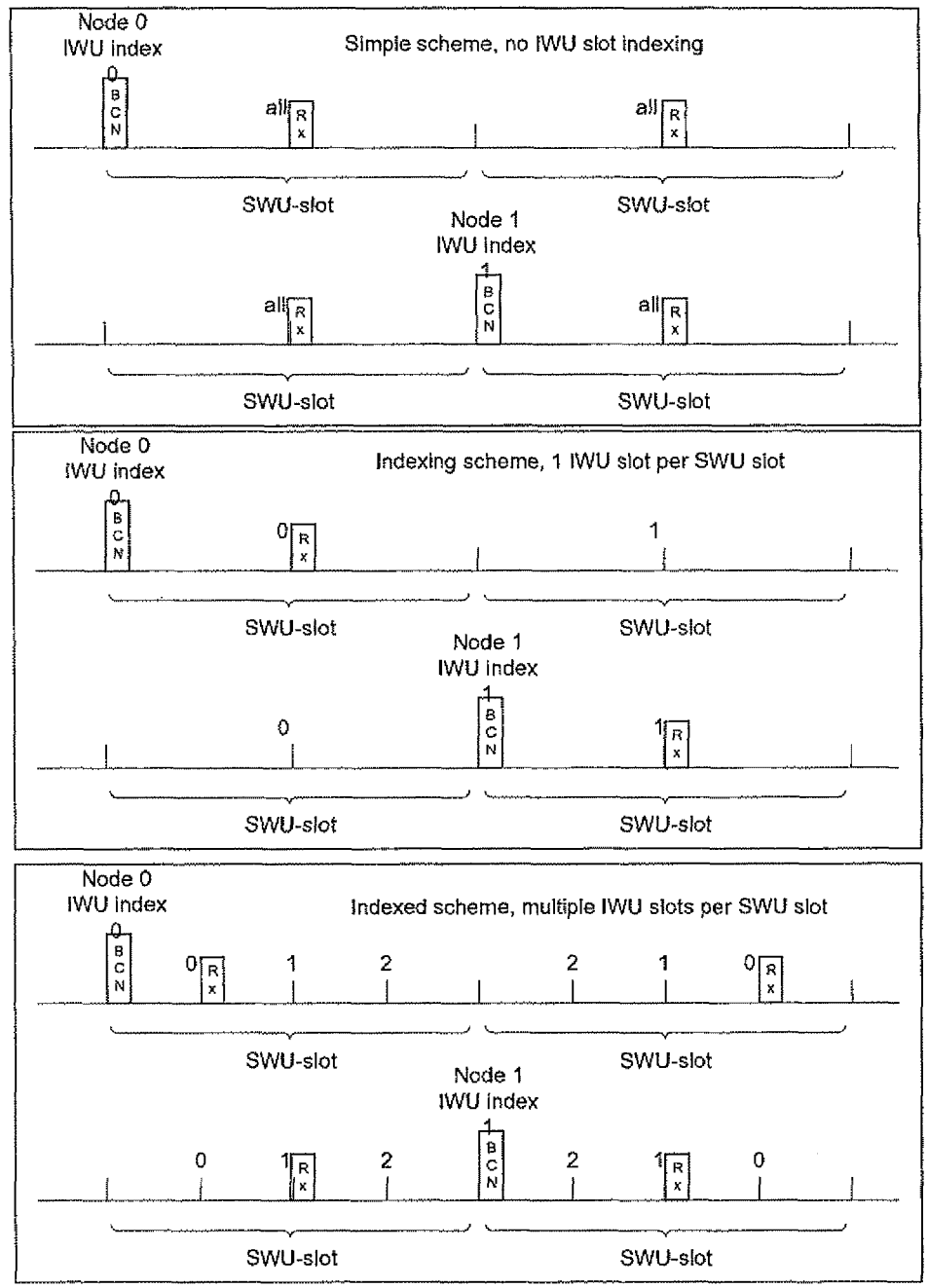
FIG. 9 illustrates how beacons and induced wake-up token listening periods fit together in time; basic and alternative schemes are provided.

FIG. 9 illustrates how beacons or pilot signals and IWU token listening periods fit together in time. For simplicity of the diagram, examples are shown for a network of two nodes. However, this is not intended to limit the invention in any way.

The top part of FIG. 9 shows a basic scheme with no IWU slot indexing, meaning that both nodes will go into a token listening mode at the same time.

The middle part of FIG. 9 shows a first alternative scheme, with only one IWU slot per SWU slot. In one SWU slot, only one of the nodes goes into token listening mode.

The bottom part of FIG. 9 shows yet another alternative scheme, with multiple IWU slots per SWU slot. As can be seen, the two nodes each go in token listening mode at different moments in time, however, all within one SWU slot.

In the examples illustrated, there are a plurality of token listening periods in between two beacon or pilot signals. The number of token listening periods in between two beacon or pilot signals is not intended to be limiting for the present invention: typically many more token listening periods than illustrated may be present in between two beacon or pilot signals, such as for example 32 or 64 token listening periods in one beacon or pilot period. It will be appreciated by a person skilled in the art that this way of working in accordance with the present invention both reduces power consumption of the individual nodes and thus of the network as a whole, and at the same time decreases data transmission latency. The more token listening periods are available per second, the shorter the latency of the network is.

The combination of synchronised wake-up and induced wake-up in accordance with embodiments of the present invention minimises the number of wake-up tokens that need to be sent to a neighbouring node, since, due to the synchronising, the sending node knows when the neighbouring node will wake up and will adapt the timing of its wake-up token accordingly.

When performing low-power duty-cycled communication in accordance with embodiments of the present invention as described above, i.e. communication where nodes alter between a wake-up and a sleeping state, all transfers of information are concentrated within short periods of time (active periods), which makes data collisions, both on transmission of wake-up tokens and on transmission of actual data, much more likely than in a network where radios are always turned on, and the transfers are much more randomly timed. Such collisions can decrease the performance of sending of wake-up tokens.

Therefore, the present invention also provides a mechanism to minimise collisions in duty-cycled networks. In accordance with embodiments of the present invention, this may be obtained by any suitable wake-up token collision avoidance scheme. Different mechanisms may be used in such collision avoidance scheme, such as for example:

carrier sensing, also called clear channel assessment. This avoids collisions, as a node, before sending a wake-up token, senses whether the channel the message is to be sent on is idle or busy. If the channel is sensed "idle" then the node is permitted to transmit the wake-up token or wake-up tokens. If the channel is sensed as "busy" the node has to defer its transmission.

random slot selection for transmission of wake-up tokens spreads the risk of collisions. In this case, the nodes in the network are assigned to different slot for sending the wake-up tokens. A plurality of nodes may be assigned to a same slot.

canceling token transmission if during listening for wake-up tokens already sent it is found that another node has already sent a wake-up token to a same destination node. This is very powerful in data gathering networks like e.g. sensor networks, where the data flow is naturally organized as a tree, where multiple children need to send to a same parent.

Figure 10:
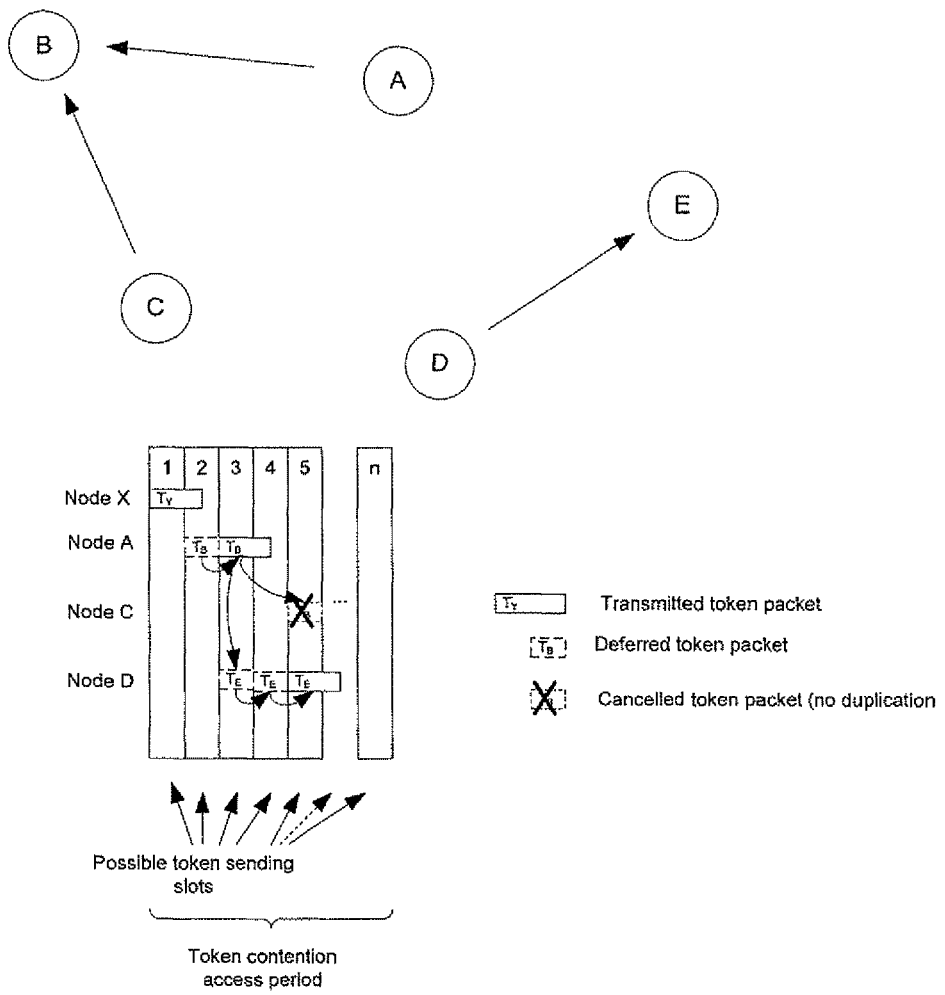
FIG. 10 illustrates an embodiment of a wake-up token collision avoidance scheme for use with embodiments of the present invention.

This is illustrated in FIG. 10. A plurality of possible token sending slots during a token contention access period are illustrated, numbered 1, 2, 3, 4, 5 to n. During slot 1, a node X is transmitting a wake-up token to a node Y. During slot 2, node A, wishing to send a wake-up token to node B, senses the channel and detects that it is busy, as node X is still transmitting its wake-up token to node Y. The token packet to node B is deferred until slot 3. At slot 3, node A senses that the channel is idle, and sends its wake-up token to node B. At the same time, node D, wishing to transmit a wake-up token to node E, senses that the channel is busy, and defers transmission. Transmission of the wake-up token from node A to node B continues during timeslot 4, so transmission of the wake-up token from node D to node E is deferred further. During timeslot 5, node D senses that the channel is idle, and transmits its wake-up token to node E. Node C, also wishing to transmit data to node B, has detected that node B is already addressed by another node, and therefore cancels its token packet until a next IWU period, as no duplication of token packets is allowed.

Figure 11:
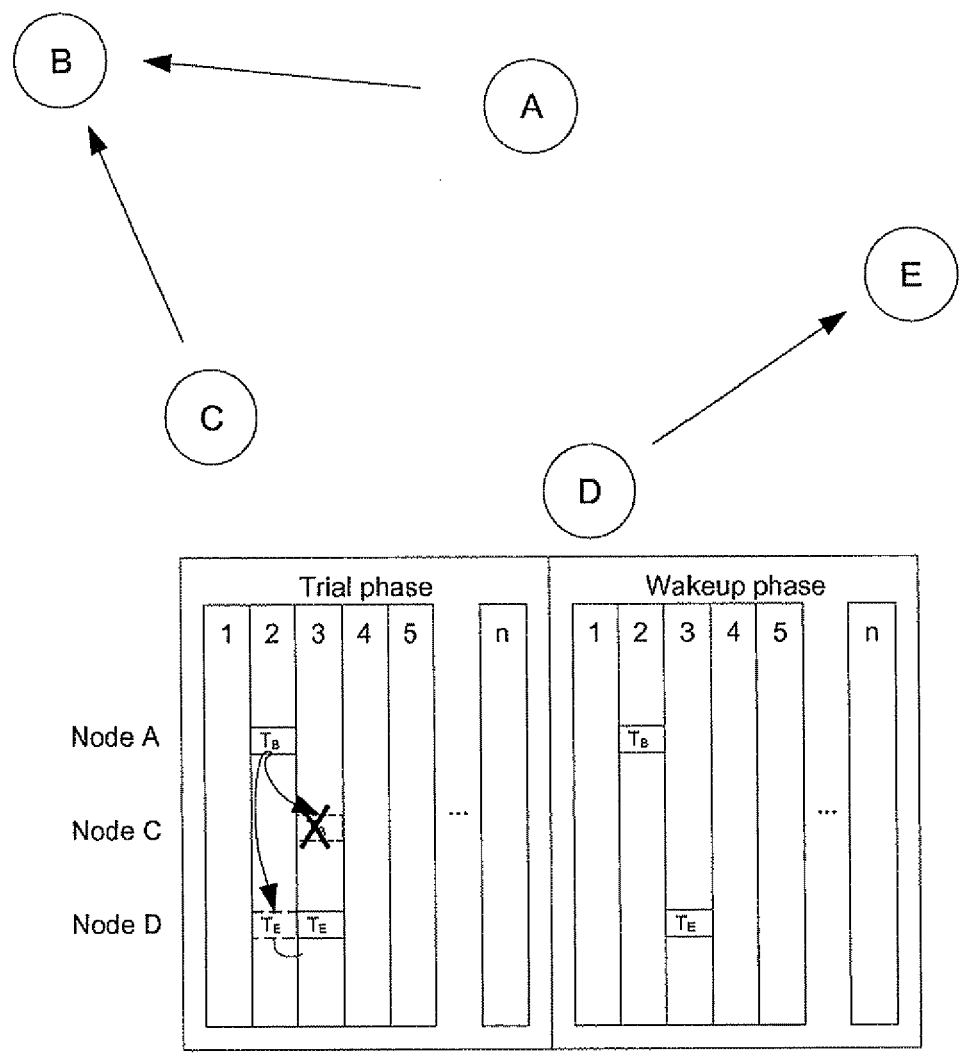
FIG. 11 illustrated splitting a wake-up token transmitting phase into two cycles according to further embodiments of the present invention.

According to a specific embodiment illustrated in FIG. 11, token collision avoidance is obtained by splitting the wake-up cycle into two phases, a trial phase and a wake-up phase.

In the first phase, called the trial phase, a node (node A) that needs to transmit a wake-up token to a sleeping node (node B) listens for neighbour nodes that would already have started to send wake-up tokens to Node B, the sleeping node. A node that needs to wake-up another node thus listens for identical wake-up tokens. In some cases there will be no other nodes that have already started to send wake-up tokens to Node B. In other cases, one or more nodes may have already started to send wake-up tokens to Node B. In the example illustrated in FIG. 11, both Node A and Node C have to transmit data to Node B, so any of these two will be the first one to try to wake up Node B. Thus, if a neighbour already tries to wake up the desired destination node, than the particular node does not need to send a wake-up token anymore.

In improved embodiments of the present invention, collision avoidance furthermore includes doing a random back-off on the wake-up tokens. In the example given, Node A starts transmitting tokens at a randomised time when none of its neighbour nodes is trying to wake up Node B, in the example given Node A starts transmitting at time 2 of the Trial phase. The transmission time of Node A is not only randomised, but also postponed if a "clear channel assessment" returns false. In the example illustrated, at time 2 not other nodes were trying to wake up Node B, therefore the "clear channel assessment" returns true for Node A. However, Node C, which would be starting transmission at time 3 of the trial phase gets a false as the result of its "clear channel assessment", therefore its transmission of data towards Node B will be postponed. When a node has been able to capture a slot where the channel was clear, as slot 2 for Node A, that node will keep this slot for the second phase. During this first phase, the trial period, Node B is and remains sleeping.

In the second phase, called the wake-up phase, Node B is woken up by Node A or Node C, either of which has gained priority during the trial period. In the example illustrated, Node B will be woken up by Node A. In the wakening, Node A and Node C will thus not contend anymore, hence eliminating the risk of collision during the wake-up of Node B. Avoiding collisions during this wakening phase is desirable given the short wake-up time of Node B, which was introduced in accordance with the present invention to minimise power consumption.

This optional mechanism of collision avoidance delivers superior reliability in low-power situations.

As an extension to the 3-node scenario described above, a fourth node, Node D can be in the process of waking up another sleeping node, Node E, at the same time when Node A and Node B are in the process of waking up Node B. The clear channel assessment, which is used by every transmitting node (Nodes A, C, D), minimises the risk of collision. The clear channel assessment carried out by node D during time slot 2 of the trial phase, results in Node A already having captured that slot. Therefore, capturing a slot is postponed for Node D until slot 3, which returns a positive result to the clear channel assessment.

To even further minimise collisions, or to speed up transfers, IWU wake-up slots can be numbered. Each node then gets one or more specific timeslots to wake up for token listening. Or in other words, not all nodes wake up for token listening at all IWU slots, but some nodes wake up at different IWU slots than others. This is called IWU timeslot distribution.

Figure 12:
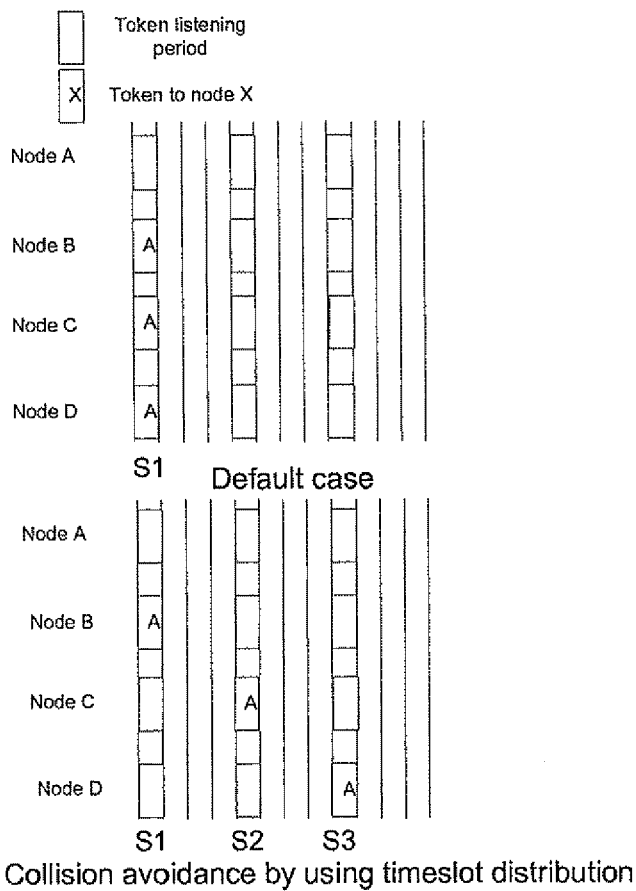
FIG. 12 illustrates how token transmission timeslot distribution in accordance with yet another embodiment of the present invention can lead to improved collision avoidance.

This is illustrated in FIG. 12. In the default case according to embodiments of the present invention, as illustrated in the middle of FIG. 12, when Node B, Node C and Node D want to send a message to Node A, these nodes B, C and D send a wake-up token to Node A. If the message to be sent is present at nodes B, C, and D at the same time, these three nodes will send their wake-up tokens at the same time, during a first time slot S1. During that time slot S1, node A is in a token listening mode. When nodes B, C and D send their token at the same time, these tokens might collide, and node A will not wake up. Hence, nodes B, C and D will have to send a wake-up token at another time again. When doing correct scheduling in accordance with embodiments of the present invention, collisions on tokens is avoided or at least reduced, and also the chance of having to do retransmissions is reduced.

When using timeslot distribution as in accordance with embodiments of the present invention, illustrated in the bottom part of FIG. 12, collisions may be reduced or even avoided. The nodes are then scheduled to send wake-up tokens during pre-determined timeslots only, which are distributed so as to reduce or avoid the number of collisions occurring. In the example illustrated in the bottom part of FIG. 12, Node B is scheduled to send wake-up tokens (if necessary because a message is to be sent) at time slot S1, Node C is scheduled to send wake-up tokens (if necessary because a message is to be sent) at time slot S2, and Node D is scheduled to send wake-up tokens (if necessary because a message is to be sent) at time slot S3. The other nodes, not scheduled to send wake-up tokens at these time slots, are in a token listening mode at these periods of time, as illustrated in the bottom part of FIG. 12.

Figure 13:
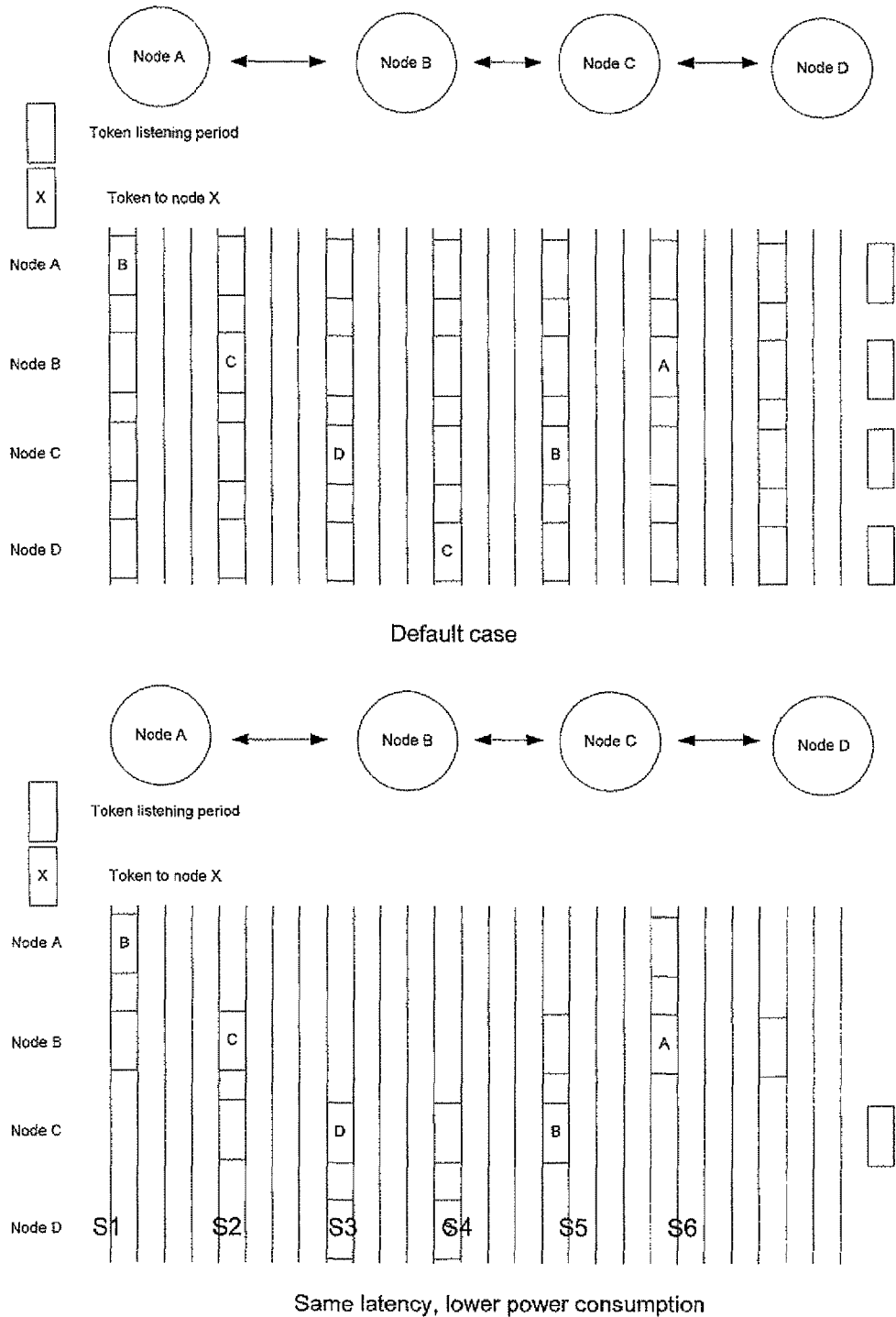
FIG. 13 illustrates token transmission timeslot distribution according to an embodiment of the present invention, and how it can be used to conserve power, while keeping a same latency.

The above collision avoidance scheme is again illustrated in the top of FIG. 13. An improvement of this collision avoidance scheme is illustrated in FIG. 13, bottom part, for four nodes, Node A, Node B, Node C and Node D. Not all nodes wake up for token listening during all timeslots. Nodes are scheduled so as to make sure that the IWU slot on which a node can send data to its neighbour is different from the slot of all of its neighbours. In the example illustrated, during a first timeslot S1, only Node B wakes up to check for wake-up tokens being present. As illustrated, at that moment in time Node A might be sending one or more wake-up tokens. If node B receives such wake-up token addressed to it, it will stay awake for receiving a message; if not, it will go back to sleep. During a second time slot S2, only node C wakes up to check for wake-up tokens being present. As illustrated, at that moment in time Node B might be sending one or more wake-up tokens. If Node C receives such wake-up token addressed to it, it will stay awake; if not, it will go back to sleep. During a third timeslot S3, only Node D wakes up to check for wake-up tokens being present. During a fourth time slot S4, again only Node C wakes up to check for wake-up tokens being present. During a fifth timeslot S5, only Node B wakes up to check for wake-up tokens being present. And during a sixth timeslot S6, only Node A wakes up to check for wake-up tokens being present. It is to be noted that the sequence illustrated is for the sake of explanation only, and is not intended to limit the invention in any way. Whatever useful sequence may be scheduled for the token listening periods.

It can be seen from comparing the top and bottom parts of FIG. 13 that a same latency is obtained for data transmission (messages are transported between nodes much faster), while conserving power for the token listening modes (the nodes are in token listening mode a reduced amount of times).

Figure 14:
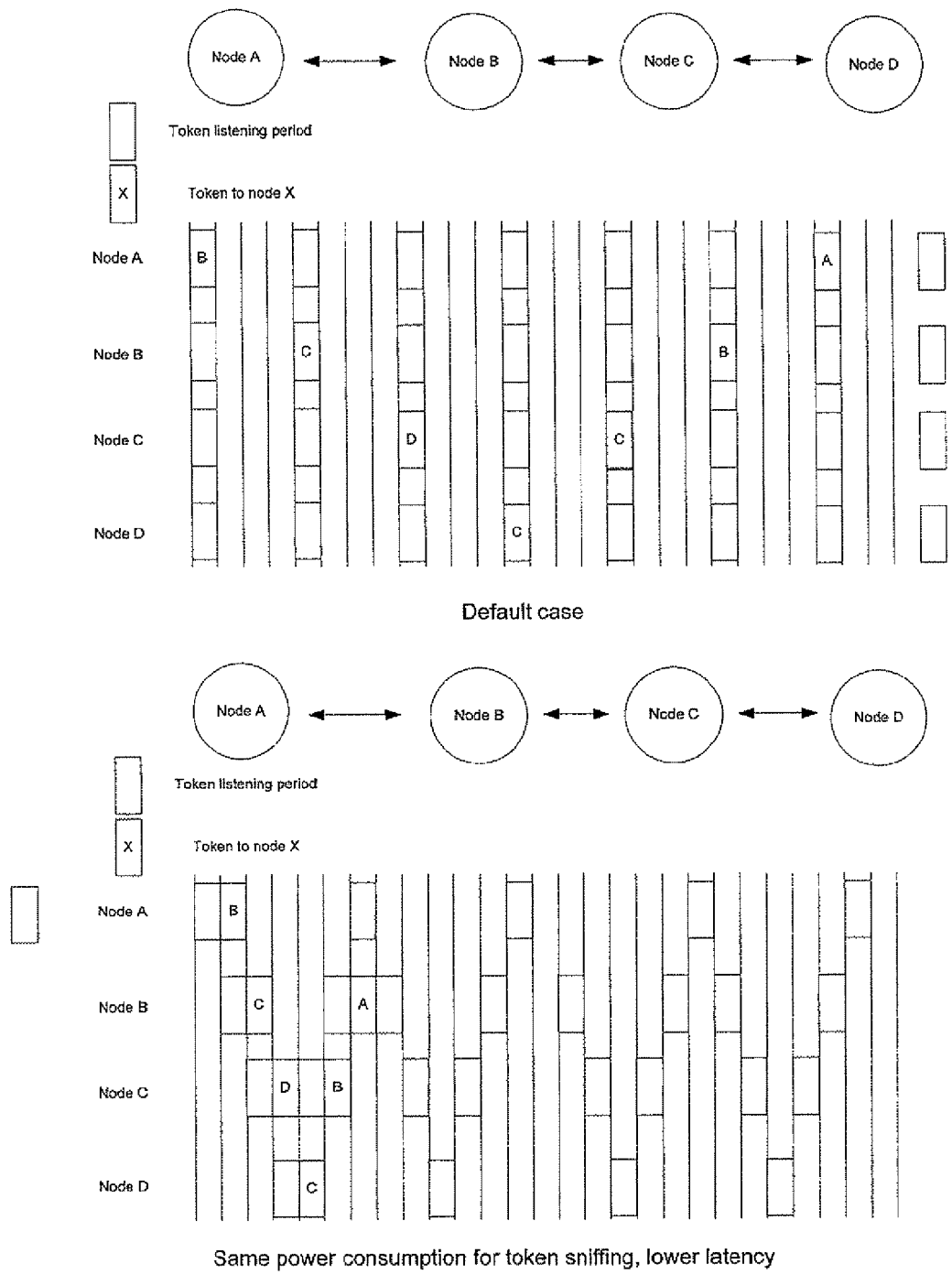
FIG. 14 illustrates token transmission timeslot distribution according to an embodiment of the present invention, and how it can lead to lower latency, while keeping the same power consumption.

The above collision avoidance scheme of FIG. 12 is again illustrated in the top of FIG. 14. An improvement of this collision avoidance scheme is illustrated in the bottom part of FIG. 14. In this case, data latency is reduced while keeping the same power consumption. This is obtained by having nodes go in a token listening mode more often, as can easily be appreciated from the bottom of FIG. 14. Neighbouring nodes have overlapping token transmission and token listening modes.

This system of numbered slots as explained above for various embodiments can be used in a number of ways, for different purposes. All of these purposes can be grouped under the name 'Quality of Service' improvements.

One effect of IWU timeslot distribution in accordance with embodiments of the present invention is to avoid collisions. When wanting to avoid collisions, one can make sure that the IWU slot on which a node can send data to its neighbour is different from the slot of all of its neighbours. An advantage of this, is that the number of collisions on wake-up tokens is reduced, or that even no collisions on wake-up tokens can occur anymore, thus improving bandwidth and power consumption, because less re-tries are needed on the tokens.

Another effect of IWU timeslot distribution in accordance with embodiments of the present invention is to minimise power consumption and/or to decrease latency. This can be obtained by scheduling time-slot distributed wake-up periods for nodes along a multi-hop route a packet has to travel. In case a packet has to travel from Node A to Node B to Node C to Node D, the scheduling can for example be as illustrated in FIG. 12 to FIG. 14.

This way of scheduling can be used either to speed up transfers with respect to single number slots while keeping the power consumption at the same level. This is done by shifting the different token listening periods of different nodes along a path relative to each other. (See FIG. 12) Alternatively, the power consumption of the node can be brought down, because it only has to wake up at its specific slot, while still maintaining the same latency requirements. This is illustrated in FIG. 13.

Time division multiple access (TDMA) is a known channel access method for shared medium (usually radio) networks. It allows several nodes to share a same frequency channel by dividing the signal into different timeslots. The nodes transmit in rapid succession, one after the other, each using its own timeslot. TDMA schemes thus naturally enable a duty cycle on sensor nodes as channel access is done on a slot-by-slot basis. Time is slotted and slots are arranged in frames. Within each frame, slots are assigned to individual nodes and can be used for transmitting/receiving packets from other nodes. Nodes need to turn on their radio only during their own slots and can sleep during slots assigned to other nodes. The present invention distinguishes from pure TDMA systems in that it allows contention based access. A hybrid system between pure contention based access and pure TDMA has been made. Depending on the needs we can do more rigid slot allocation, or we can shift more to the direction of contention based medium access. It is to be understood that although preferred embodiments, specific constructions and configurations have been discussed herein for devices according to the present invention, various changes or modifications in form and detail may be made without departing from the scope and spirit of this invention. For example, functionality may be added or deleted from the block diagrams and operations may be interchanged among functional blocks. Steps may be added or deleted to methods described within the scope of the present invention.

The invention claimed is:

1. A method of communication between a first, a second and a third node in a wireless multi-hop network, the method comprising:
   bringing the first node and the second node respectively the third node in a fully operative mode for communication with each other, and
   subsequently bringing the first node and the second node respectively the third node in a reduced operative mode where no communication with any other node is possible,
   wherein the method furthermore comprises:
   before bringing the respective node in the fully operative mode, bringing the respective node in a listening mode during a token listening period to check for presence of a wake-up token,
   bringing the respective node into the reduced operative mode if no wake-up token is received, and bringing the respective node into the fully operative mode for reception of data if a wake-up token is received, and
   wherein the method furthermore comprises synchronising the timing of the listening mode of the respective node with the timing of the transmitting of the wake-up tokens by another node, wherein synchronising includes one node transmitting a beacon signal and another node synchronising with the beacon signal,
   wherein the number of wake-up tokens, sent by the respective node during each time the respective other node is in said listening mode, is not more than a single wake-up token,
   wherein collisions of the wake-up tokens are reduced by using a collision avoidance scheme according to which the third node intending to send a wake-up token to the second node, having received a wake-up token sent from the first node to the second node cancels the wake-up token to the second node, and
   respectively scheduling a first, second and third time slot selected among different time slots in a beacon period between two subsequent beacon signals,
   respectively allocating the token listening period of the second node to the first time slot, the token listening period of the third node to the second time slot and the token listening period of the first node to the third time slot.

2. The method according to claim 1, wherein an additional time slot is allocated behind the selected time slot.

3. The method according to claim 1, wherein all nodes in the network synchronise with the beacon signal.

4. The method according to claim 1, wherein the wake-up token is an electromagnetic wave data packet with a length of between 200 μs and 5 ms.

5. The method in accordance with claim 1, furthermore comprising transmitting a wireless communication data packet from the first node to the second node.

6. The method in accordance with claim 5, furthermore comprising the second node acknowledging receipt of the wireless communication data packet to the first node.

7. A wireless data communication system, comprising:
   a plurality of nodes organised into a multi-hop network of connection paths between said nodes,
   wherein the nodes are configured to have a reduced operative mode in which said node is inoperative to transmit or receive wireless communications, and an fully operative mode during which said node is operative to transmit or receive wireless communications to or from a neighbouring node within reception range,
   a node furthermore being configured to, before going into the fully operative mode, go in a listening mode during which it listens for tokens sent by a neighbouring node within reception range, the node being configured to decide, depending on the outcome of the listening mode, to go into the fully operative mode after reception of a wake-up token from the neighbouring node, or to go into the reduced operative mode if no such wake-up token is received,
   wherein the system furthermore comprises an internal time reference in form of a beacon that is periodically sent for synchronising operation of the nodes, wherein the number of wake-up tokens, sent by the first node during each time the first node is in said fully operative mode, is not more than a single wake-up token, and
   wherein collisions of the wake-up tokens are reduced by using a collision avoidance scheme according to which a third node intending to send a wake-up token to a second node, having received a wake-up token sent from a first node to the second node is configured to cancel the wake-up token to the second node, and
   to respectively schedule a first, second and third time slot selected among different time slots between two subsequent beacon signals, and
   to respectively allocate a period for listening to tokens of the second node to the first time slot, a period for listening to tokens of the third node to the second time slot and a period for listening to tokens of the first node to the third time slot.

8. The wireless data communication system according to claim 7, wherein a node comprises:

a receiver for receiving wireless communications data packets from a neighbouring node, a transmitter for transmitting wireless communication data packets to a neighbouring node, and a processor, said processor being programmed to bring the node in the listening mode at pre-determined time intervals to listen for tokens sent by a neighbouring node within reception range, and if such token is received, to bring the node into its fully operative mode, and if not, to bring the node into its reduced operative mode.

9. The wireless data communication system according to claim 8, furthermore comprising a counter for timing the duration of the listening mode.

10. The wireless data communication system according to claim 9, wherein the counter is hardware implemented.

11. The wireless data communication system according to claim 9, wherein the counter is implemented in software.

12. The wireless data communication system according to claim 7, wherein a node is configured to transmit, during its fully operative mode, a wireless communication data packet to a neighbouring node which is also brought in its fully operative mode.

13. The wireless data communication system according to claim 12, wherein the neighbouring node is configured to, after having received the wireless communication data packet, transmit an acknowledgement message to the node.

14. The wireless data communication system according to claim 7, wherein the internal time reference includes a beaconing system.

15. The wireless data communication system according to claim 7, including a node comprising a time slot allocation unit for allocating a time slot for sending data packets.

16. The wireless data communication system according to claim 7, wherein a node is configured to perform clear channel assessment before transmission of a wireless communication data packet.

17. The wireless data communication system according to claim 7, wherein a node is a sensor.

18. A controller for controlling operation of a node in a wireless multi-hop network, the controller comprising:

first mode switching means for bringing the node in a listening mode during a token listening period to check for presence of a wake-up token transmitted by another node, second mode switching means for bringing the node in a fully operative mode for communication with another node if a wireless communication data packet is to be sent to another node or if a wake-up token is received from another node, and third mode switching means for bringing the node in a reduced operative mode where no communication with any other node is possible if no wireless communication data packet is to be sent to another node and if no such wake-up token is received, wherein the controller further comprises an internal time reference in the form of a beacon receiver/transmitter for synchronising operation of the nodes, the number of wake-up tokens, transmitted by the other node during each time the first node is in said fully operative mode, comprises not more than a single wake-up token, wherein the first mode switching means is configured to bring the node in the listening mode during a first time slot selected among different time slots between two subsequent beacon signals, and wherein the controller is configured to reduce collisions of the wake-up tokens by using a collision avoidance scheme according to which it is configured to bring the node intending to send a wake-up token to a second node, having received a wake-up token sent from a first node to the second node to cancel the wake-up token to the second node.

19. The controller in accordance with claim 18, wherein the controller is an embedded controller.

20. A non-transitory machine readable data storage device storing a computer program product, which when executed by a processor, carries out the method recited in claim 1.

* * * * *